(12) United States Patent
Baek et al.

(10) Patent No.: US 12,167,301 B2
(45) Date of Patent: Dec. 10, 2024

(54) METHOD AND TERMINAL FOR IMPLEMENTING COMMUNICATION

(71) Applicant: Samsung Electronics Co., Ltd., Gyeonggi-do (KR)

(72) Inventors: Yun-Sun Baek, Gyeonggi-do (KR); Nishant Gupta, Sitapur (IN); Kill-Yeon Kim, Gyeonggi-do (KR); Duk-Gu Sung, Seoul (KR); Jae-Woong Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 254 days.

(21) Appl. No.: 17/725,191

(22) Filed: Apr. 20, 2022

(65) Prior Publication Data

US 2022/0248186 A1 Aug. 4, 2022

Related U.S. Application Data

(63) Continuation of application No. 16/752,246, filed on Jan. 24, 2020, now abandoned, which is a
(Continued)

(51) Int. Cl.
*H04W 4/10* (2009.01)
*H04L 65/403* (2022.01)
(Continued)

(52) U.S. Cl.
CPC ............ *H04W 4/10* (2013.01); *H04L 65/4046* (2013.01); *H04L 65/4061* (2013.01); *H04W 4/08* (2013.01);
(Continued)

(58) Field of Classification Search
CPC ......... H04W 4/10; H04W 4/08; H04W 76/45; H04W 76/50; H04W 84/18; H04W 4/90;
(Continued)

(56) References Cited

U.S. PATENT DOCUMENTS

| 6,477,150 | B1 | 11/2002 | Maggenti et al. |
| 2009/0137263 | A1 | 5/2009 | Abbale et al. |
| 2014/0112194 | A1 | 4/2014 | Novian |

FOREIGN PATENT DOCUMENTS

| EP | 1 622 408 | 2/2006 |
| EP | 2 271 169 | 1/2011 |

(Continued)

OTHER PUBLICATIONS

3GPP TS 23.179 V13.0.0 (Dec. 2015).*
(Continued)

*Primary Examiner* — Zhitong Chen
(74) *Attorney, Agent, or Firm* — The Farrell Law Firm P.C.

(57) ABSTRACT

Provided is a method performed by a terminal of performing communication, the method including generating a private call setup request message including a call identifier information element (IE), a caller IE, a callee IE, and a call type IE set to an emergency private call, based on receiving a user indication to upgrade a call to emergency call, wherein the terminal is in an in-progress private call state; setting a proximity-based services (ProSe) per-packet priority corresponding to the emergency private call; transmitting, to another terminal, the private call setup request message; starting a timer relating to private call request retransmission based on the emergency call setup request message; and entering an in-progress emergency private call state from the in-progress private call state.

15 Claims, 39 Drawing Sheets

Related U.S. Application Data continuation of application No. 16/065,909, filed as application No. PCT/KR2016/015167 on Dec. 23, 2016, now abandoned.

(60) Provisional application No. 62/279,102, filed on Jan. 15, 2016, provisional application No. 62/279,117, filed on Jan. 15, 2016, provisional application No. 62/387,195, filed on Dec. 24, 2015, provisional application No. 62/387,192, filed on Dec. 24, 2015.

(51) Int. Cl.
*H04L 65/4061* (2022.01)
*H04W 4/08* (2009.01)
*H04W 76/45* (2018.01)
*H04W 76/50* (2018.01)
*H04W 84/18* (2009.01)

(52) U.S. Cl.
CPC ........... *H04W 76/45* (2018.02); *H04W 76/50* (2018.02); *H04W 84/18* (2013.01)

(58) Field of Classification Search
CPC .... H04W 76/30; H04W 4/16; H04L 65/4046; H04L 65/4061; H04L 65/1069; H04L 65/1083; H04L 65/1086; H04L 69/28
See application file for complete search history.

(56) References Cited

FOREIGN PATENT DOCUMENTS

| KR | 10-0718856 | 5/2007 |
|---|---|---|
| WO | WO 2017/026866 | 2/2017 |

OTHER PUBLICATIONS

3GPP TS 24.379 V1.0.0 (Dec. 2015).*
3GPP 3rd Generation Partnership Project; Technical Specification Group Services and System Aspects; Mission Critical Push to Talk (MCPTT) over LTE; Stage 1 (Release 13), 3GPP TS 22.179 V13.3.0, Dec. 2015, 78 pages.
3GPP 3rd Generation Partnership Project; Technical Specification Group Services and System Aspects; Functional Architecture and Information Flows to Support Mission Critical Communication Services; Stage 2 (Release 13), 3GPP TS 23.179 V13.0.0, Dec. 2015, 207 pages.
Jong Mun Lee et al., Advancement of Public Safety Network Based on PS-LTE: Technical Perspective of Group Communication, Nov. 2015, 10 pages.
International Search Report dated Apr. 25, 2017 issued in counterpart application No. PCT/KR2016/015167, 15 pages.
European Search Report dated Oct. 19, 2018 issued in counterpart application No. 16879398.2-1213, 11 pages.
3GPP, 3rd Generation Partnership Project; Technical Specification Group Core Networks and Terminals; Mission Critical Push to Talk (MCPTT) Call Control Protocol Specification (Release 13), 3GPP TS 24.379 V1.0.0, Dec. 2015, 120 pages.
European Search Report dated Mar. 3, 2020 issued in counterpart application No. 19212156.4-1213, 9 pages.
Ericsson, "Resource Management in MCPTT", S6-151077, 3GPP TSG-SA WG6 Meeting #7, Oct. 12-16, 2015, 18 pages.
Harris Corporation, "Off-Network Emergency Private Cell", S6-151342, 3GPP TSG-SA WG6 Meeting #8, Nov. 16-20, 2015, 4 pages.
European Search Report dated Jan. 19, 2022 issued in counterpart application No. 21209671.3-1213, 14 pages.
Hoyeon Lee, Seongjin Park, Seongeon Cho, "5th 3GPP TSG SA6 (Disaster Safety Net) Meeting", TTA Journal, vol. 160, Aug. 10, 2015, 6 pages.
Korean Office Action dated Oct. 17, 2023 issued in counterpart application No. 10-2016-0177952, 9 pages.
EP Intention to Grant dated Oct. 27, 2023 issued in counterpart application No. 21209671.3-1213, 128 pages.
Indian Notice of Hearing dated Jun. 26, 2023 issued in counterpart application No. 201837022806, 2 pages.
EP Notice of Allowance dated Aug. 31, 2023 issued in counterpart application No. 21209671.3-1213, 128 pages.

* cited by examiner

FIG. 6

| IEI | IE(Information Element) | TYPE/REFERENCE | PRESENCE | FORMAT | LENGTH |
|---|---|---|---|---|---|
| | PRIVATE CALL SETUP REQUEST MESSAGE IDENTITY) | MESSAGE TYPE | M | V | 1 |
| | CALL IDENTIFIER | CALL IDENTIFIER | M | V | 2 |
| | COMMENCE MODE | COMMENCE MODE | M | V | 1 |
| | MCPTT USER UD OF CALLER | MCPTT USER ID | M | LV-E | 1 |
| | MCPTT USER ID OF CALLEE | MCPTT USER ID | M | LV-E | 1 |
| | CALL TYPE | CALL TYPE | M | V | 1 |
| | USE FLOOR CONTROL INDIFICATION | FLOOR CONTROL MODE | M | V | 1 |
| | SDP | SDP | M | LV-E | 3~x |
| | USER LOCATION | LOCATION | O | LV-E | 3~x |

FIG. 7

| IEI | IE(Information Element) | TYPE/REFERENCE | PRESENCE | FORMAT | LENGTH |
|---|---|---|---|---|---|
| | PRIVATE CALL SETUP REQUEST MESSAGE IDENTITY) | MESSAGE TYPE | M | V | 1 |
| | CALL IDENTIFIER | CALL IDENTIFIER | M | V | 2 |
| | MCPTT USER ID OF CALLER | MCPTT USER ID | M | LV-E | 3-x |
| | MCPTT USER ID OF CALLEE | MCPTT USER ID | M | LV-E | 3-x |

FIG. 8

| IEI | IE (Information Element) | TYPE/REFERENCE | PRESENCE | FORMAT | LENGTH |
|---|---|---|---|---|---|
| | PRIVATE CALL SETUP REQUEST | MESSAGE TYPE | M | V | 1 |
| | CALL IDENTIFIER | CALL IDENTIFIER | M | V | 2 |
| | MCPTT USER ID OF CALLER | MCPTT USER ID | M | LV-E | 3-x |
| | MCPTT USER ID OF CALLEE | MCPTT USER ID | M | LV-E | 3-x |
| | USE FLOOR CONTROL INDICATION | 발언권 제어 모드 | M | V | 1 |
| | SDP | SDP | M | LV-E | 3-x |

FIG. 9

| IEI | IE(Information Element) | TYPE/REFERENCE | PRESENCE | FORMAT | LENGTH |
|---|---|---|---|---|---|
| | PRIVATE CALL REJECT MESSAGE IDENTITY | MESSAGE TYPE | M | V | 1 |
| | CALL IDENTIFIER | CALL IDENTIFIER | M | V | 2 |
| | MCPTT USER ID OF CALLER | MCPTT USER ID | M | LV-E | 3-x |
| | MCPTT USER ID OF CALLEE | MCPTT USER ID | M | LV-E | 3-x |
| | REASON | FLOOR CONTROL MODE | M | LV-E | 3-x |

FIG. 10

| IEI | IE (Information Element) | TYPE/REFERENCE | PRESENCE | FORMAT | LENGTH |
|---|---|---|---|---|---|
| | PRIVATE CALL RELEASE MESSAGE IDENTITY | MESSAGE TYPE | M | V | 1 |
| | CALL IDENTIFIER | CALL IDENTIFIER | M | V | 2 |
| | MCPTT USER ID OF CALLER | MCPTT USER ID | M | LV-E | 3-x |
| | MCPTT USER ID OF CALLEE | MCPTT USER ID | M | LV-E | 3-x |

FIG. 11

| IEI | IE (Information Element) | TYPE/REFERENCE | PRESENCE | FORMAT | LENGTH |
|---|---|---|---|---|---|
| | PRIVATE CALL RELEASE ACK MESSAGE IDENTITY | MESSAGE TYPE | M | V | 1 |
| | CALL IDENTIFIER | CALL IDENTIFIER | M | V | 2 |
| | MCPTT USER ID OF CALLER | MCPTT USER ID | M | LV-E | 3-x |
| | MCPTT USER ID OF CALLEE | MCPTT USER ID | M | LV-E | 3-x |

FIG. 12

| IEI | IE (Information Element) | TYPE/REFERENCE | PRESENCE | FORMAT | LENGTH |
|---|---|---|---|---|---|
| | PRIVATE CALL ACCEPT ACK MESSAGE IDENTITY | MESSAGE TYPE | M | V | 1 |
| | CALL IDENTIFIER | CALL IDENTIFIER | M | V | 2 |
| | MCPTT USER ID OF CALLER | MCPTT USER ID | M | LV-E | 3-x |
| | MCPTT USER ID OF CALLEE | MCPTT USER ID | M | LV-E | 3-x |

FIG. 13

| IEI | IE(Information Element) | TYPE/REFERENCE | PRESENCE | FORMAT | LENGTH |
|---|---|---|---|---|---|
| | PRIVATE EMERGENCY CALL CANCEL MESSAGE IDENTITY | MESSAGE TYPE | M | V | 1 |
| | CALL IDENTIFIER | CALL IDENTIFIER | M | V | 2 |
| | MCPTT USER UD OF CALLER | MCPTT USER ID | M | LV-E | 3-x |
| | MCPTT USER ID OF CALLEE | MCPTT USER ID | M | LV-E | 3-x |

FIG. 14

| IE | IE(Information Element) | TYPE/REFERENCE | PRESENCE | FORMAT | LENGTH |
|---|---|---|---|---|---|
| | PRIVATE EMERGENCY CALL CANCEL MESSAGE IDENTITY) | MESSAGE TYPE | M | V | 1 |
| | CALL IDENTIFIER | CALL IDENTIFIER | M | V | 2 |
| | MCPTT USER UD OF CALLER | MCPTT USER ID | M | LV-E | 3-x |
| | MCPTT USER ID OF CALLEE | MCPTT USER ID | M | LV-E | 3-x |

FIG. 15
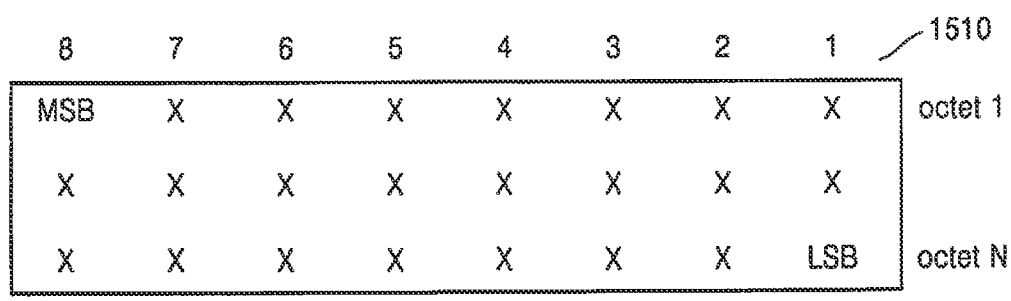
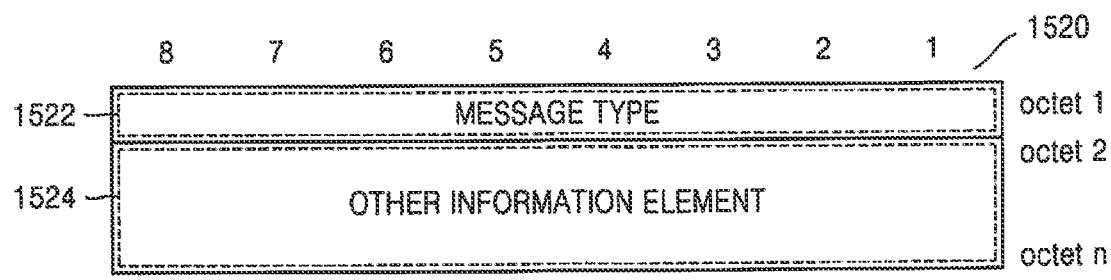

FIG. 16

```
                                                1600
Bits
8 7 6 5 4 3 2 1

0 0 0 0 0 0 0 1    PRIVATE CALL SETUP REQUEST
0 0 0 0 0 0 1 0    PRIVATE CALL RINGING
0 0 0 0 0 0 1 1    PRIVATE CALL ACCEPT
0 0 0 0 0 1 0 0    PRIVATE CALL REJECT
0 0 0 0 0 1 0 1    PRIVATE CALL RELEASE
0 0 0 0 0 1 1 0    PRIVATE CALL RELEASE ACK
0 0 0 0 0 1 1 1    PRIVATE CALL BUSY
0 0 0 0 1 0 0 0    PRIVATE CALL NO ANSWER
0 0 0 0 1 0 0 1    PRIVATE CALL ACCEPT ACK
All other values are reserved.
```

FIG. 19

```
                                                                    ┌─1900
┌─────────────────────────────────────────────────────────────────┐
│ Bits                                                            │
│ 8  7  6  5  4  3  2  1                                          │
│                                                                 │
│ 0  0  0  0  0  0  0  0      AUTOMATIC COMMENCE MODE             │
│ 0  0  0  0  0  0  0  1      MANUAL COMMENCE MODE                │
│                                                                 │
│ All other values are reserved.                                  │
└─────────────────────────────────────────────────────────────────┘
```

FIG. 25

```
Bits
8 7 6 5 4 3 2 1

0 0 0 0 0 0 0 1      PRIVATE CALL
0 0 0 0 0 0 1 0      EMERGENCY PRIVATE CALL

All other values are reserved.
```
— 2500

FIG. 32

| Field name | Field ID | Description | |
|---|---|---|---|
| - | 000-099 | Used by RTCP | ~3210 |
| Useue | 100 | MCPPTT user identity | ~3220 |
| Queue | 101 | Wating list | ~3230 |
| Priority-level | 102 | Priority value | ~3240 |
| - | 103-255 | Reserved for future use | ~3250 |

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|  subtype  |   PT=APP=204  |            length             |
+-+-+-+-+-+-+-+-+-+-+-+-+-+-+-+-+-+-+-+-+-+-+-+-+-+-+-+-+-+-+-+-+
|        SSRC of floor control client granted permission to send Media        | ─ 3510
+-+-+-+-+-+-+-+-+-+-+-+-+-+-+-+-+-+-+-+-+-+-+-+-+-+-+-+-+-+-+-+-+
|                          name=MCPT                            |
+-+-+-+-+-+-+-+-+-+-+-+-+-+-+-+-+-+-+-+-+-+-+-+-+-+-+-+-+-+-+-+-+
|  UserID = 100 |  UserID - length |       UserID value        | ─ 3520
+-+-+-+-+-+-+-+-+-+-+-+-+-+-+-+-+-+-+-+-+-+-+-+-+-+-+-+-+-+-+-+-+
| ..                                                         ..|
+-+-+-+-+-+-+-+-+-+-+-+-+-+-+-+-+-+-+-+-+-+-+-+-+-+-+-+-+-+-+-+-+
```

METHOD AND TERMINAL FOR IMPLEMENTING COMMUNICATION

CROSS-REFERENCE TO RELATED APPLICATION(S)

This continuation application is based on and claims priority under 35 U.S.C. § 120 to U.S. patent application Ser. No. 16/752,246, filed on Jan. 24, 2020 in the United States Patent and Trademark Office, which is a Continuation Application of U.S. patent application Ser. No. 16/065,909, filed on Jun. 25, 2018 in the United States Patent and Trademark Office, which is a National Phase Entry of International Application No. PCT/KR2016/015167, which was filed on Dec. 23, 2016, and claims priority to U.S. Provisional Patent Application Nos. 62/387,192 and 62/387,195, which were filed on Dec. 24, 2015, and 62/279,102 and 62/279,117, which were filed on Jan. 15, 2016, the contents of each of which are incorporated herein by reference.

BACKGROUND

1. Field

The present disclosure relates generally to a method and terminal for implementing communication.

2. Description of Related Art

Recently, interest in a public safety network that may provide a communication service in emergency situations such as a disaster situation has been increasing. In the case of such a special-purpose dedicated communication service, communication may be performed based on a service such as push-to-talk (PTT). In the case of the PIT-based communication service, only a terminal that has obtained the floor may perform speech (e.g., media transmission).

On the other hand, in the case of the public safety network, since a network resource such as a server may not be supported, a situation in an off network in which a central controller does not exist needs to be considered. That is, in the case of the public safety network, direct communication between terminals needs to be considered.

Accordingly, in order to implement a PTT-based communication service in an off-network, it is necessary to research and develop a process capable of controlling call setup, floor management, and the like.

SUMMARY

According to an aspect of the present disclosure, a method, performed by a terminal, of generating a private call setup request message including a call identifier information element (IE), a caller IE, a callee IE, and a call type IE set to an emergency private call, based on receiving a user indication to upgrade a call to emergency call, wherein the terminal is in an in-progress private call state; setting a proximity-based services (ProSe) per-packet priority corresponding to the emergency private call; transmitting, to another terminal, the private call setup request message; starting a timer relating to private call request retransmission based on the emergency call setup request message; and entering an in-progress emergency private call state from the in-progress private call state.

The predetermined event may include an event of a floor request being received from the other terminal.

According to another aspect of the present disclosure, a terminal for performing communication includes a transceiver; and a processor coupled with the transceiver and configured to generate a private call setup request message including a call identifier IE, a caller IE, a callee IE, and a call type IE set to an emergency private call, based on receiving a user indication to upgrade a call to emergency call, wherein the terminal is in an in-progress private call state, set a ProSe per-packet priority corresponding to the emergency private call, control the transceiver to transmit, to another terminal, the private call setup request message, starting a timer relating to private call request retransmission based on the emergency call setup request message, and enter an in-progress emergency private call state from the in-progress private call state.

BRIEF DESCRIPTION OF DRAWINGS

The above and other aspects, features, and advantages of certain embodiments of the present disclosure will be more apparent from the following description taken in conjunction with the accompanying drawings.

FIG. 6 is a diagram for explaining content included in a private call setup request message, according to an embodiment.

FIG. 7 is a diagram for explaining content included in a private call ringing message, according to embodiment.

FIG. 8 is a diagram for explaining content included in a private call accept message, according to embodiment.

FIG. 9 is a diagram for explaining content included in a private call reject message, according to an embodiment.

FIG. 10 is a diagram for explaining content included in a private call release message, according to an embodiment.

FIG. 11 is a diagram for explaining content included in a private call release acknowledgement message, according to an embodiment.

FIG. 12 is a diagram for explaining content included in a private call accept acknowledgement message, according to an embodiment.

FIG. 13 is a diagram for explaining content included in a private emergency call cancel message, according to an embodiment.

FIG. 14 is a diagram for explaining content included in a private emergency call cancel acknowledgement message, according to an embodiment.

FIG. 15 is a diagram for explaining IE coding and format of a MCPTT Off-Network Protocol (MONP) message, according to an embodiment.

FIG. 16 is a diagram for explaining a message type of a MONP message, according to an embodiment.

FIG. 19 is a diagram for explaining a commencement mode IE of a MONP message, according to an embodiment.

FIG. 25 is a diagram for explaining a call type IE of a MONP message, according to an embodiment.

FIG. 32 is a diagram for explaining floor control message fields according to an embodiment.

FIG. 35 is a diagram showing a floor taken message according to an embodiment.

DETAILED DESCRIPTION

Figure 1:
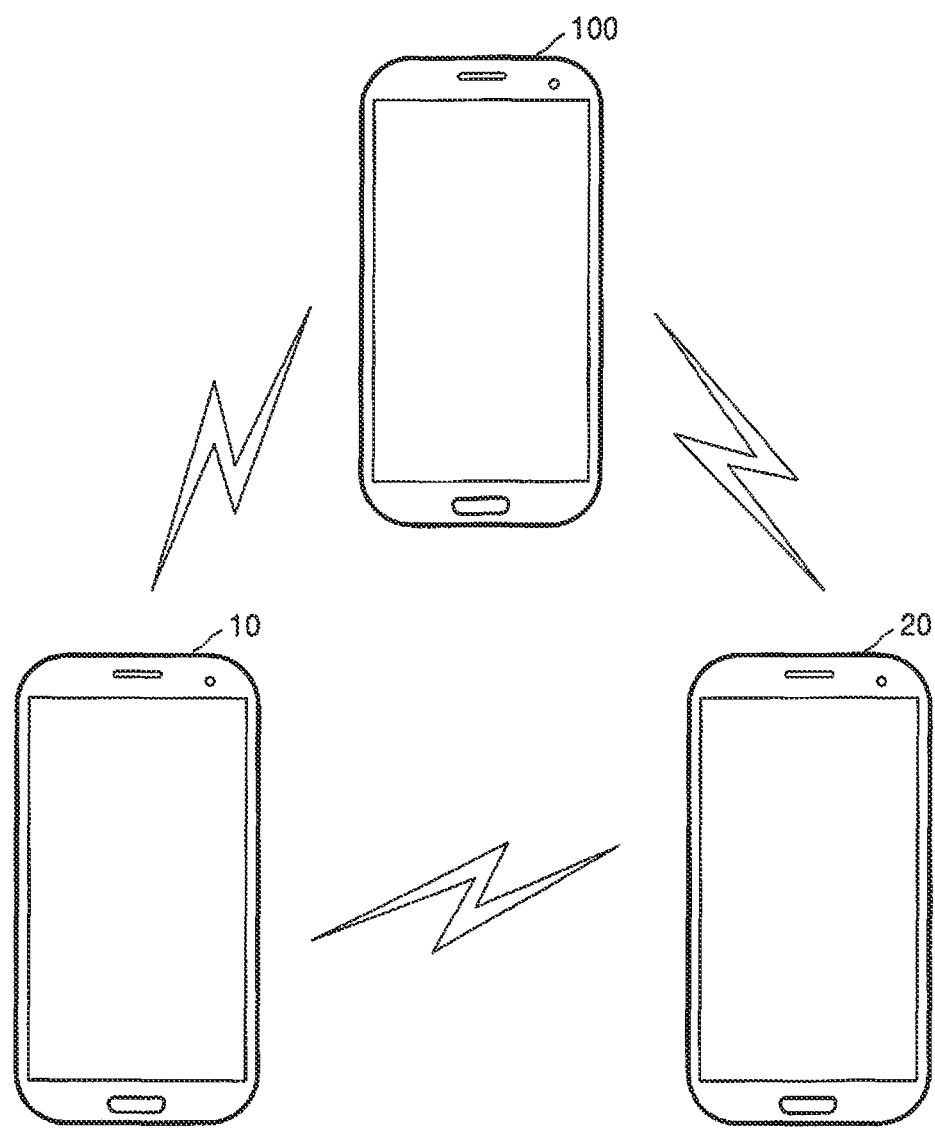
FIG. 1 is a diagram for explaining a method performed by a terminal of performing communication, according to an embodiment.

Terminology used in this specification will now be briefly described before describing embodiments in detail.

Provided are a method and terminal for performing communication in order to control call set up, call type switching, floor management, etc., which may occur in a Mission Critical Push To Talk (MCPTT) service provided in an off network situation.

Terms including ordinals such as first, second, etc. may be used to describe various elements, but the elements are not limited by terms. Terms are used only for the purpose of distinguishing one component from another. For example, without departing from the scope of the disclosure, a first component may be referred to as a second component, and similarly, a second component may also be referred to as a first component. As used herein, the term "and/or" includes any and all combinations of one or more of the associated listed items.

It will be understood that the terms "comprises", "comprising", "includes" and/or "including", when used herein, specify the presence of stated elements, but do not preclude the presence or addition of one or more other elements. The term "unit" or "module" is used to denote an entity for performing at least one function or operation, and may be embodied as a software element or a hardware element or a combination of hardware and software.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. In the following description, for clarity, parts or elements that are not related to the embodiments are omitted.

FIG. 1 is a diagram for explaining a method performed by a terminal 100 of performing communication, according to an embodiment.

Referring to FIG. 1, the terminal 100 according to an embodiment may provide a Mission Critical Push To Talk (MCPTT) service in an LTE based public safety network that is named as a public safety LTE (PS-LTE). The MCPTT service may support one-to-one and one-to-many voice/video communications. In the MCPTT service, a user may start talking by pressing a talk button of the terminal 100 to start talking, while a specific user speaks, other users may listen to talking of the specific user.

Meanwhile, various types of networks in which the MCPTT service is provided may be present. For example, in the case of an on-network that is a first type, as in the case of a cellular phone, a user may speak through the support of a network infrastructure such as a server. According to another example, in the case of an off-network that is a second type, a user of the terminal 100 may speak directly without using the network infrastructure. That is, in the case of the off-network, the user of the terminal 100 may perform speech according to a set rule, without an arbitrator that controls communication such as approving a floor, unlike the on-network. Thus, the off-network may be used for communication between users in a situation where the network infrastructure is not equipped or in a special situation where the network infrastructure may not be supported.

In the case of the off-network type MCPTT service, prior to performing private communication, a call set-up process which is a process of determining multimedia parameters and sharing the determined multimedia parameters between terminals may be performed. Here, the multimedia parameters may include an audio/video codec, a multimedia port, an encoding key, and the like, but this is merely an example, and the multimedia parameters are not limited to the above-described examples.

In the off-network type MCPTT service, when the terminal 100 establishes emergency communication with another terminal (for example, 10) or upgrades a private call previously established with another terminal (for example, 10) to an emergency call, the terminal 100 may announce information related to an emergency situation without a central server.

A method performed by the terminal 100 of controlling a call setup will be described later in detail with reference to FIGS. 2 to 25.

Meanwhile, according to an embodiment, when a call is set up between the terminal 100 and one or more other terminals 10 and 20, it is necessary to determine a terminal having a floor, that is, authority to transmit media. The off network does not have a central server for controlling the floor, and thus the terminal 100 and the one or more other terminals 10 and 20 may control the floor according to preset rules.

A method performed by the terminal 100 of controlling the floor will be described later in more detail with reference to FIGS. 26 to 38.

Figure 2:
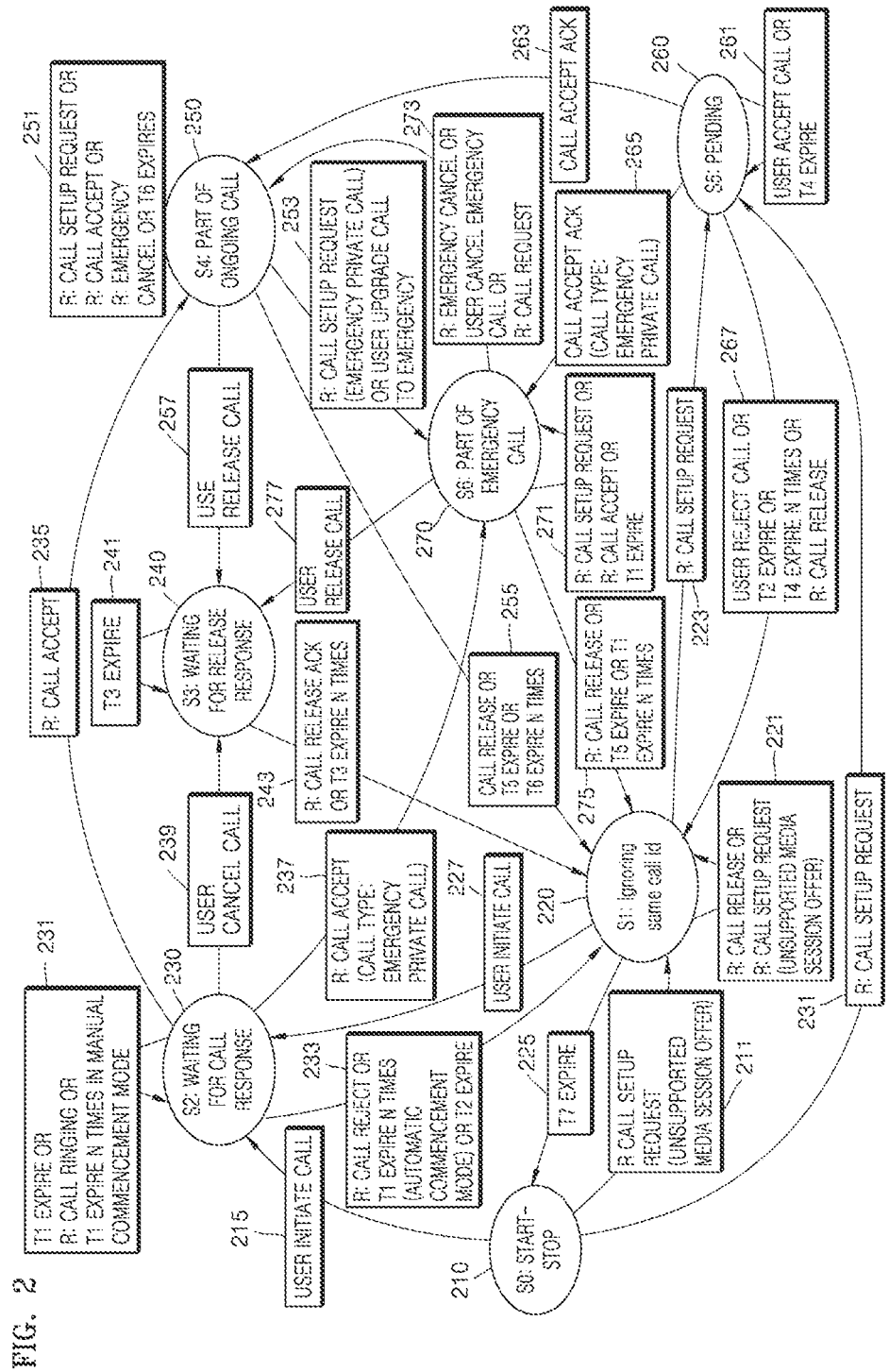
FIG. 2 is a state diagram for explaining a method performed by the terminal of performing communication with other terminals, according to an embodiment.

FIG. 2 is a state diagram for explaining a method performed by the terminal 100 of performing communication with other terminals (for example, 10 and 20), according to an embodiment.

Referring to FIG. 2, the terminal 100 may exist in any one of a plurality of states shown in the state diagram during a process of controlling a private call.

In the present embodiment, a start-stop state 210 (hereinafter referred to as S0 state) may represent a state in which no call control terminal exists, and an ignoring same call id state 220 (hereinafter referred to as S1 state) may represent a state in which user equipment (UE) is not part of an ongoing private call.

Also, a wait for call response 230 (hereinafter referred to as S2 state) may represent a state in which the UE has sent a private call setup request message and is waiting for a response, a private call accept or private call reject message. A wait for release response 240 (hereinafter referred to as S3 state) may represent a state in which the UE has sent a private call release message and is waiting for a private call release acknowledgement message.

Also, a part of ongoing call 250 hereinafter referred to as S4 state) may represent a state in which the UE is part of an ongoing private call. A pending state 260 (hereinafter referred to as S5 state) may represent a state in which the UE has presented a notification to the user for the received private call setup request message and is waiting for a user indication. A part of the emergency call state 270 (hereinafter referred to as S6 state) may represent that UE is part of an ongoing emergency private call.

In order to participate in a private call, the terminal 100 may send a MCPTT Off-Network Protocol (MONP) message as a UDP message to a local IP address of the user, on a User Datagram Protocol (UDP) port, with an IP time-to-live set to 255. The UDP message received on a TBD port may be treated as the received MONP message. Meanwhile, the terminal 100 may support IPv6 and listen to an IPv6 addresses.

In an off-network for MCPTT session, only MCPTT speech may be used. Also, one off-network MCPTT session may include one media-floor control entity. The terminal 100 may generate an SDP (Session Description Protocol) body for a group call in accordance with rules and procedures of RFC4566.

The terminal 100 may include a "o=" field with a <username> portion set to a dash, a "s=" field with a <session name> portion set to a dash, and a "c=" field with a <nettype> portion set to "IN", a <addrtype> portion set to an IP version of a multicast IP address of an MCPTT group and <connection-address> portions set to the multicast IP address of the MCPTT group.

Also, the terminal 100 may include a media-level section for MCPTT speech. In this regard, the media-level section for MCPTT speech may include a "m=" field with a <media> portion set to "audio", a <port> portion set to a port number for MCPTT speech of the MCPTT group, a <proto> field set to "RTP/AVP", and a <fmt> portion set indicating RTP payload type numbers. Also, the media-level section for MCPTT speech may include a "i=" field with a <session description> portion set to "speech". Also, at least one of "a=fmtp:" attribute(s) and "a=rtpmap:" attribute(s) included in the media-level section for MCPTT speech may indicate codec(s) and media parameters of the MCPTT speech. Also, when a media steam uses an address other than a default IP address, the media-level section for MCPTT speech may include a "a=rtcp:" attribute indicating a port number to be used for RTCP at the terminal 100 selected according to the rules and procedures of IETF RFC 3605.

Also, the terminal 100 may include the media-level section for media-floor control entity. In this regard, the media-level section for media-floor control entity may include an "m=" line, with the <media> portion set to "application", the <port> portion set to a port number for media-floor control entity of the MCPTT group, the <proto> field set to "udp" and the <fmt> portion set to "MCPTT". Also, the media-level section for media-floor control entity may include a "a=fmtp:MCPTT" attribute indicating parameters of the media-floor control entity as specified 3GPP TS 24.380.

<Private Call Setup>

Initiating a Private Call

According to an embodiment, when in the S0 state 210 or the SI state 220, an indication from the terminal user to initiate a private call is received 215 or 227, the terminal 100:

1) may generate and store a call identifier as a random number uniformly distributed between 0 and 65536.
2) may store own terminal user ID as a caller ID.
3) may store the terminal user ID of a callee as a callee ID.
4) may store an 'automatic commencement mode' as a commencement mode, if requested. Otherwise, the terminal 100 may store a 'manual commencement mode' as the commencement mode. Meanwhile, in the automatic commencement mode, a call is automatically accepted when a call comes in, and in the manual commencement mode, a call may be established after receiving acknowledgement of call acceptance from a user or the like.
5) may store a requested call type as a call type.
6) may store 'true' as sent floor control indication, if requested, Otherwise, the terminal 100 store 'false' as sent floor control indication.
7) may store a current user location as a user location.
8) may generate and store an offered SDP, as defined above.
9) may generate a private call setup request message.

In this regard, the private call setup request message may be specified to set a call identifier IE with the stored call identifier, the user ID of the caller IE with the stored caller ID, and the user ID of the callee IE with the stored callee ID, Also, the private call setup request message may be specified to set a commencement mode IE with a stored commencement mode, the call type IE with a stored call type, and a use floor control indication IE with a stored sent floor control indication. Also, the private call setup request message set a SDP IE with a stored offered SDP. Also, when the stored call type IE is an emergency private call, the private call setup request message may be specified to set a user location IE with a stored user location.

10) may send the private call setup request message towards other terminal 100.
11) may start a timer T1 relating to private call request retransmission.
12) may enter the S2 state 230.

Private Call Setup Request Retransmission

When in the S2 state 230, the timer T1 relating to private call request retransmission expires 231, the terminal 100:
1) may update the stored user location with a current user location.
2) may generate a private call setup request message. In this regard, the private call setup request message may be specified to set the call identifier IE with the stored call identifier, the user ID of the caller IE with the stored caller ID, and the user ID of the callee IE with the stored callee ID. The private call setup request message may also set the commencement mode IE with the stored commencement mode, the call type IE with the stored call type, and the use floor control indication with the stored sent floor control indication. The private call setup request message may also set the SDP IE with the stored offered SDP. When the stored call type IE is an emergency private call, the private call setup request message may also set the user location IE with the stored user location.
3) may send the private call setup request message towards other terminal 100.
4) may start the timer T1 relating to private call request retransmission.
5) may remain in the S2 state 230.

Ringing Notification to the User

When in the S2 state 230, a private call ringing message is received 231, the terminal 100:
1) may notify the user that the private call ringing message is received.
2) may remain in the S2 state 230.

No Response to a Private Call Setup Request with the Automatic Commencement Mode In the S2 state 230, when the timer T1 relating to private call request retransmission expires for a configurable number of times and the stored commencement mode is the automatic commencement mode 231, the terminal 100:
1) may start a timer T7 relating to waiting for any message with the same call identifier.
2) may notify the user about unreachability of a called party.
3) may enter the SI state 220.

No Response to the Private Call Setup Request with the Manual Commencement Mode

When in the S2 state 230, the timer T1 relating to private call request retransmission expires for a configurable number of times and the stored commencement mode is the manual commencement mode 231, the terminal 100:
1) may start a timer T2 relating to waiting for call response message.
2) may remain in the S2 state 230.

No Response to the Private Call Setup Request after Waiting for User Acknowledgement When in the S2 state 230, the timer T2 relating to waiting for call response message expires 233, the terminal 100:
1) may start the timer T7 relating to waiting for any message with the same call identifier.
2) may notify the user about unreachability of the called party.
3) may enter the SI state 220.

Private Call Setup Request Rejected

When in the S2 state 230, a private call reject message in response to the private call setup request message with the same call identifier and with a reason IE set to 'reject' is received 233, the terminal 100:
1) may stop the timer T1 relating to call setup retransmission, when the timer T1 is running.
2) may stop the timer T2 relating to waiting for call response message when the timer T2 is running.
3) may start the timer T7 relating to waiting for any message with the same call identifier.
4) may notify the user about call rejection.
5) may enter the SI state 220.

Private Call Setup Request Accepted

In the S2 state 230 or the S4 state 250, when a stored call type with respect to the private call setup request message is a private call, and a private call accept message is received in response to the private call setup request message with the same call identifier 235, the terminal 100:
1) may store the use floor control indication IE received in the private call accept message as a received floor control indication.
2) may generate a private call accept acknowledgement message. In this regard, the private call accept acknowledgement message may be specified to set the call identifier IE to the stored call identifier, the user ID of the caller IE with the stored caller ID, and the user ID of the callee IE with the stored callee ID.
3) may send the private call accept acknowledgement message in response to the request message.
4) may stop the timer T1 relating to call setup retransmission when the timer T1 is running.
5) may stop the timer T2 relating to waiting for call response message when the timer T2 is running.
6) may establish a media session based on the SDP body of private call.
7) may start floor control as a terminating floor participant when both the stored received floor control indication and sent floor control indication are set to 'true'.
8) may start a timer T5 relating to call release when a current state is the S2 state 230.
9) may enter the S4 state 250 when the current state is the S2 state 230.

Emergency Private Call Setup Request Accepted

In the S2 state 230 or the S6 state 270, when the stored call type IE is the emergency private call, and the private call accept message is received in response to the private call setup request message with the same call identifier 237, the terminal 100:
1) may store the use floor control indication IE received in the private call accept message as the received floor control indication.
2) may generate a private call accept acknowledgement message. In this regard, the private call accept acknowledgement message may be specified to set the call identifier IE to the stored call identifier, the user ID of the caller IE with stored caller ID, and the user ID of the callee IE with the stored callee ID.
3) may send the private call accept acknowledgement message in response to the request message.
4) may stop the timer T1 relating to call setup retransmission when the timer T1 is running.
5) may stop the timer T2 relating to waiting for call response message when the timer T2 is running.
6) may establish the media session based on the SDP body of the private call.
7) may set Prose Per-Packet priority to higher priority than priority of the private call.
8) may start floor control as the terminating floor participant when both the stored received floor control indication and sent floor control indication are set to 'true'.
9) may start the timer T5 relating to call release when the current state is the S2 state 230.

10) may enter the S6 state 270 when the current state is the S2 state 230.

User Cancels the Private Call Setup Request

When in the S2 state 230 an indication from the user to cancel the private call request is received 239, the terminal 100:
1) may generate a private call release message. In this regard, the private call release message set the call identifier IE to the stored call identifier, the user ID of the caller IE with stored caller ID, and the user ID of the callee IE with the stored callee ID.
2) may send the private call release message in response to the request message. For example, the terminal 100 may receive a request from an upper layer (e.g., an application layer) of an ongoing call setup layer or may receive a request from a user.
3) may start a timer T3 relating to private call release retransmission.
4) may enter the S3 state 240.

Reject to Private Call Setup Request

When in the S2 state 230, a private call reject message with the reason IE is received 233, the terminal 100:
1) may stop the timer T1 relating to call setup retransmission when the timer T1 is running.
2) may stop the timer T2 relating to waiting for call response message when the timer T2 is running.
3) may start the timer T7 relating to waiting for any message with the same call identifier.
4) may notify the user about a reason to reject invitation to another terminal of which invitation is rejected.
5) may enter the S1 state 220.

<Private Call Setup in Automatic Commencement Mode>

Unable to Establish Media

When in the S0 state 210 or in the S1 state 220, the private call setup request message with a call identifier IE different from the stored call identifier is received and a media session declared in the SDP body of the private call setup request message is not established 211 or 221, the terminal 100: For example, it may be determined whether the media session is established according to whether a specific port, a specific codec, or the like required for receiving media is supported. The media session may not be established when a port and codec of the terminal 100 do not match the specific port and the specific codec required for receiving media.
1) may store the call identifier IE in the received message as a call identifier.
2) may store the user ID of the caller IE in the received private call setup request message as a caller ID.
3) may store own user ID as a callee ID.
4) may generate a private call reject message. In this regard, the private call reject message may be specified to set the call identifier IE to the call identifier, the user ID of the callee IE with the stored callee ID, and the user ID of the caller IE with the stored caller ID. Also, the private call reject message may be specified to set the reason IE as 'reject'.
5) may send the private call reject message in response to the request message.
6) may start the timer T7 relating to waiting for any message with the same call identifier when the current state is the S0 state 210.
7) may restart the timer T7 relating to waiting for any message with the same call identifier when the current state is the S1 state 220.
8) may enter the S1 state 220 when the current state is the S0 state 210.

Responding to Private Call Setup Request when not Participating in the Ongoing Call When in the S0 state 210 the private call setup request message with the commencement mode IE set to the automatic commencement mode and the call identifier IE different from the stored call identifier is received and the media session declared in the SDP body of the private call setup request message is established 213, the terminal 100:
1) may store the call identifier IE in the received message as the call identifier.
2) may store the call type IE in the received message as the call type.
3) may store the user ID of the caller IE in the received private call setup message as the caller ID.
4) may store own user ID as the callee ID.
5) may store the use floor control indication IE in the received message as received floor control indication. When the received floor control indication is 'true', the terminal 100 may set and store the sent floor control indication as requested.
6) may generate and store an answer SDP.
7) may generate a private call accept message. In this regard, the private call accept message may be specified to set the call identifier IE to the stored call identifier, the user ID of the callee IE with the stored callee ID, and the user ID of the caller IE with the stored caller ID. The private call accept message may be specified to set the use floor control indication IE with the stored sent floor control indication. The private call accept message may be specified to set the SDP IE with the stored answer SDP.
8) may send the private call accept message in response to the request message.
9) may establish the media session based on the SDP body of the private call.
10) may start floor control as the terminating floor participant when both the stored received floor control indication and sent floor control indication is set to 'true'.
11) may start a timer T4 relating to private call accept retransmission.
12) may enter the S5 state 260.

Private Call Accept Retransmission

When in the S5 state 260 the timer T4 relating to private call accept retransmission expires 261, the terminal 100:
1) may generate a private call accept message. In this regard, the private call accept message may be specified to set the call identifier IE to the stored call identifier, the user ID of the callee IE with the stored callee ID, and the user ID of the caller IE with the stored caller ID. The private call accept message may be specified to set the use floor control indication IE with the stored sent floor control indication. The private call accept message may be specified to set the SDP IE with the stored answer SDP.
2) may send the private call accept message in response to the request message.
3) may start the timer T4 relating to private call accept retransmission.
4) may remain in the S5 state 260.

Establishing the Call

When in the S5 state 260 the stored call type is a private call, and the private call accept acknowledgement message is received or RTP media is received from an originating user 263, the terminal 100:
1) may stop the timer T4 relating to private call accept retransmission.

2) may notify the user of call establishment.
3) may start floor control as the terminating floor participant when both the stored sent floor control indication and received floor control indication are 'true'.
4) may start the timer T5 relating to call release.
5) may enter the S4 state 250.

Establishing the Call as Emergency Private Call

When in the S5 state 260 the stored call type is the emergency private call and a private call accept acknowledgement message is received or RTP media is received from the originating user 265, the terminal 100:
1) may stop the timer T4 relating to private call accept retransmission.
2) may notify the user of call establishment.
3) may start floor control as the terminating floor participant when both the stored sent floor control indication and received floor control indication are 'true'.
4) may set the ProSe Per-Packet Priority to higher priority than priority of the private call.
5) may start the timer T5 relating to call release.
6) may enter the S6 state 270.

Call Failure

In the S5 state 260, when the timer T4 relating to private call accept retransmission expires for a configurable number of times 267, the terminal 100:
1) may notify the user of a call failure.
2) may start the tinier T7 relating to waiting for any message with the same call identifier.
3) may enter the SI state 220.

Responding to the Private Call Setup Request when Participating in the Ongoing Call When in the S4 state 250 or S6 state 270 a private call setup request message is received 251 or 271, the terminal 100:
1) may store a user ID of a caller IE of the private call setup request message as the caller ID.
2) may store own user ID as the callee ID.
3) may generate a private call reject message. In this regard, the private call reject message may be specified to set the call identifier IE to the stored call identifier, the user ID of the callee IE with the stored callee ID, and the user ID of the caller IE with the stored caller ID. The private call reject message may also set the reason IE as 'busy'.
4) may send the private call reject message in response to the request message.
5) may notify the other incoming call to the user.
6) may remain in the current state.

<Private Call Setup in the Manual Commencement Mode>
Notifying User of a Private Call Setup Request According to an embodiment, when in the S0 state 210 or the SI state 220 the private call setup request message with the commencement mode IE set to the manual commencement mode and the call identifier IE different from the stored call identifier is received 213 or 223, the terminal 100:
1) may store the call identifier IE in the received message as the call identifier.
2) may store the call type IE in the received message as the call type.
3) may store the user ID of the caller IE as received in the private call setup request as the caller ID.
4) may store own user ID as the callee ID.
5) may generate a private call ringing message. In this regard, the private call ringing message may be specified to set the call identifier IE to the stored call identifier, the user ID of the callee IE with the stored callee ID, and the user ID of the caller IE with the stored caller ID.
6) may send the private call ringing message in response to the request message.
7) may start the timer T2 relating to waiting for call response message.
8) may notify the incoming call to the user.
9) may enter the S5 state 260.

No Response from the User

When in the S5 state 260 the timer T2 relating to waiting for call response message expires 267, the terminal 100:
1) may generate a private call reject message.
2) may send the private call reject message in response to the request message. In this regard, the private call reject message may be specified to set the call identifier IE to the stored call identifier, the user ID of the callee IE with the stored callee ID, and the user ID of the caller IE with the stored caller ID. The private call reject message may be specified to set the reason IE as 'no answer'.
3) may start the timer T7 relating to waiting for any message with the same call identifier.
4) may enter the S1 state 220.

User Accepts the Private Call Setup Request

When in the S5 state 260 the indication is received from the user to accept the incoming private call 261, the terminal 100:
1) may store the use floor control indication IE in the received message as the received floor control indication. When the received floor control indication is 'true', the terminal 100 may set and store the sent floor control indication as requested.
2) may generate and store the answer SDP.
3) may generate a private call accept message. In this regard, the private call accept message may be specified to set the call identifier IE to the stored call identifier, the user ID of the callee IE with the stored callee ID, and the user ID of the caller IE with the stored caller ID. The private call accept message may also set the use floor control indication IE with the stored sent floor control indication. The private call accept message may also set the SDP IE with the stored answer SDP.
4) may send the private call accept message in response to the request message.
5) may establish the media session based on the SDP body of the private call.
6) may start floor control as the terminating floor participant when both the stored received floor control indication and sent floor control indication is set to 'true'.
7) may start the timer T4 relating to private call accept retransmission.
8) may remain in the S5 state 260.

<Private Call Accept Retransmission>

When in the S5 state 260, the timer T4 relating to private call accept retransmission expires 261, the terminal 100:
1) may generate a private call accept message. The private call accept message may be specified to set the call identifier IE to the stored call identifier, the user ID of the callee IE with the stored callee ID, and the user ID of the caller IE with the stored caller ID. The private call accept message may also be specified to set the use floor control indication IE with the stored sent floor control indication. The private call accept message may also be specified to set the SDP IE with the stored answer SDP.

2) may send the private call accept message in response to the request message.
3) may start the timer T4 relating to private call accept retransmission.
4) may remain in the S5 state 260.

Establishing the Call

When in the S5 state 260 the stored call type is the private call, a private call accept acknowledgement message is received or RTP media is received from the originating user 263, the terminal 100:
1) may stop the timer T4 relating to private call accept retransmission.
2) may notify the user of call establishment.
3) may start floor control as the terminating floor participant when both the stored sent floor control indication and received floor control indication are 'true'.
4) may start the timer T5 relating to call release.
5) may enter the S4 state 250.

Establishing the Call as Emergency Private Call

When in the S5 state 260 the stored call type is the emergency private call, and the private call accept acknowledgement message is received or RTP media is received from the originating user 265, the terminal 100:
1) may stop the timer T4 relating to private call accept retransmission.
2) may notify the user of call establishment.
3) may start floor control as the terminating floor participant when both the stored sent floor control indication and received floor control indication are 'true'.
4) may set ProSe Per-Packet priority to higher priority than priority of the private call.
5) may start the timer T5 relating to call release.
6) may enter the S4 state 250.

Call Failure

In the S5 state 260, when the timer T4 relating to private call accept retransmission expires for a configurable number of times 267, the terminal 100
1) may notify the user of the call failure.
2) may start the timer T7 relating to waiting for any message with the same call identifier,
3) may enter the SI state 220.

User Rejects the Private Call Setup Request

When in the S5 state 260, an indication is received from the user to reject the incoming private call 267, the terminal 100:
1) may generate a private call reject message. In this regard, the private call reject message may be specified to set the call identifier IE to the stored call identifier, the user ID of the callee IE with the stored callee ID, and the user ID of the caller IE with the stored caller ID. The private call reject message may be specified to set the reason IE as 'reject'.
2) may send the private call reject message in response to the request message.
3) may start the timer T7 relating to waiting for any message with the same call identifier.
4) may enter the SI state 220.

Caller Cancels the Private Call Setup Request

When in the S5 state 260 or the SI state 220, a private call release message is received 267 or 221, the terminal 100:
1) may generate a private call release acknowledgement message. In this regard, the private call release acknowledgement message may be specified to set the call identifier IE to the stored call identifier, the user ID of the callee IE with the stored callee ID, and the user ID of the caller IE with the stored caller ID.
2) may send the private call release acknowledgement message in response to the request message.
3) may start the timer T7 relating to waiting for any message with the same call identifier when a current state is the S5 state 260.
4) may restart the timer T7 relating to waiting for any message with the same call identifier when the current state is the S5 state 260.
5) may enter the SI state 220 when the current state is the S5 state 260.

Responding to Private Call Setup Request when Participating in the Ongoing Call

When in the S4 state 250 or the S6 state 270, a private call setup request message is received, the terminal 100:
1) may store a call identifier IE of the private call setup request message as a waiting call identifier.
2) may store a user ID of a call IE in the private call setup request message as a waiting caller ID.
3) may generate a private call reject message. In this regard, the private call reject message may be specified to set the call identifier IE to the stored waiting call identifier, the user ID of the callee IE with the stored callee ID, and the user ID of the caller IE with the stored waiting caller ID. The private call reject message may be specified to set the reason IE as 'busy'.
4) may send the private call reject message in response to the request message.
5) may notify the other incoming call to the user.

<Switch Between Private Call and Private Emergency Call>

User Upgrades Private Call to Emergency Call

When in the S4 state 250, an indication is received from the user to upgrade the call to emergency 253, the terminal 100:
1) may generate and store an emergency offer SDP.
2) may update the caller ID as own user ID.
3) may update the callee ID as a user ID of the other user.
4) may store the current user location as the user location.
5) may generate a private call setup request message. In this regard, the private call setup request message may be specified to set the call identifier IE with the stored call identifier, the user ID of the caller IE with the stored caller ID, and the user ID of the callee IE with the stored callee ID. The private call setup request message may also be specified to set the commencement mode IE with the automatic commencement mode and the call type IE with an emergency private call. The private call setup request message may also be specified to set the use floor control indication IE with the stored sent floor control indication and the SDP IE with the emergency offer SDP. The private call setup request message may also be specified to set the user location IE with the user location.
6) may send the private call setup request message towards the other terminal 100.
7) may start the timer T1 relating to private call request retransmission.
8) may enter the S6 state 270.

Private Emergency Call Setup Request Retransmission

When in the S6 state 270, the timer T1 relating to private call request retransmission expires 271, the terminal 100:
1) may update the stored user location with the current user location.
2) may generate a private call setup request message. In this regard, the private call setup request message may be specified to set the call identifier IE with the stored call identifier, the user ID of the caller IE with the stored caller ID, and the user ID of the callee IE with the stored callee ID. The private call setup request message may also be specified to set the commencement mode IE with the automatic commencement mode and the call type IE with the emergency private call. The private call setup request message may also be specified to set the use floor control indication IE with the stored sent floor control indication and the SDP IE with the stored emergency offer SDP. The private call setup request message may also be specified to set the user location IE with the stored user location.

2) may send the private call setup request message towards the other terminal 100.

3) may start the timer T1 relating to private call request retransmission, 4) may remain in the S6 state 270.

Private Emergency Call Setup Request Rejected

When in the S6 state 270, a private call reject message in response to the private call setup request message with the same call identifier and the reason IE set to 'reject' is received 273, the terminal 100:

1) may stop the timer T1 relating to call setup retransmission.

2) may notify the user about call rejection.

3) may enter the S4 state 250.

No Response to Private Emergency Call Setup Request

In the S6 state 270, when the timer T1 relating to private call request retransmission expires for a configurable number of times, the terminal 100:

1) may start the timer T7 relating to waiting for any message with the same call identifier.

2) may notify the user about unreachability of the called party, 3) may enter the SI state 220.

Responding to Private Emergency Call Setup Request when Participating in the Ongoing Call When in the S4 state 250 or the S6 state 270, a private call setup request message with the same call identifier IE and the call type IE with the emergency private call is received 253, the terminal 100:

1) may generate and store an emergency answer SDP.

2) may update the caller ID with the user ID of the callerE as received in the private call setup request message.

3) may update the callee ID with own user ID.

4) may update the received floor control indication with the use floor control indication IE as received in the private call setup request message.

5) may generate a private call accept message. In this regard, the private call accept message may be specified to set the call identifier IE to the stored call identifier, the user ID of the callee IE with the stored callee ID, and the user ID of the caller IE with the stored caller ID. The private call accept message may also be specified to set the use floor control indication with the stored sent floor control indication. The private call accept message may also be specified to set the SDP IE with the stored emergency answer SDP.

6) may send the private call accept message in response to the request message.

7) may set ProSe Per-Packet priority to higher priority than priority of private call.

8) may start floor control as the terminating floor participant when both the stored received floor control indication and sent floor control indication are set to 'true'.

9) may enter the S6 state 270 when the current state is the S4 state 250.

User Cancels the Private Emergency Call

When in the S6 state 270, an indication is received from a caller of the emergency call to cancel the emergency private call 273, the terminal 100:

1) may generate a private emergency call cancel message. In this regard, the private emergency call cancel message may be specified to set the call identifier IE to the stored call identifier, the user ID of the caller IE with the stored caller, and the user ID of the callee IE with the stored callee.

2) may send the private emergency call cancel message.

3) may start a timer T6 relating to private emergency call cancel retransmission.

4) may enter the S4 state 250.

Private Emergency Call Cancel Retransmission

When in the S4 state 250, the timer T6 relating to private emergency call cancel retransmission expires 251, the terminal 100:

1) may generate a private emergency call cancel message. In this regard, the private emergency call cancel message may be specified to set the call identifier IE to the stored call identifier, the user ID of the caller IE with the stored caller ID, and the user ID of the callee IE with the stored callee ID.

2) may send the private emergency call cancel message.

3) may start the timer T6 relating to private emergency call cancel retransmission.

4) may remain in the S4 state 250.

Private Emergency Call Cancel Accepted

When in the S4 state 250, a private emergency call cancel acknowledgement message in response to the private emergency call cancel message with the same call identifier is received, the terminal 100:

1) may stop the timer T6 relating to private emergency call cancel retransmission when the timer T6 is running.

2) may establish a media session based on a SDP body before updated.

3) may set ProSe Per-Packet priority higher than priority of the private call.

4) may remain in the S4 state 250.

No Response to Private Emergency Call Cancel

In the S4 state 250, when the timer T6 relating to private emergency call cancel retransmission expires for a configurable number of times 251, the terminal 100:

1) may start the timer T7 relating to waiting for any message with the same call identifier.

2) may notify the user about unreachability of the called party.

3) may enter the SI state 220.

Responding to Private Emergency Call Cancel

When in the S4 state 250 or the S6 state 270, a private emergency call cancel message with the same call identifier IE is received 251 or 273, the terminal 100:

1) may generate a private emergency call cancel acknowledgement message. In this regard, the private emergency call cancel acknowledgement message may be specified to set the call identifier IE to the stored call identifier, the user ID of the callee IE with own user ID, and the user ID of the caller IE with the user ID of the caller IE.

2) may send the private emergency call cancel acknowledgement message.

3) may set ProSe Per-Packet priority higher than the priority of the private call.

4) may enter the S4 state 250 when the current state is the S6 state 270.

<Private Call Release>
Releasing a Private Call

When in the S4 state 250 or the S6 state 70, an indication is received from the user to release the private call is received 257 or 277, the terminal 100:

1) may generate a private call release message. In this regard, the private call release message may be specified to set the call identifier IE to the stored call identifier, the user ID of the caller IE with the stored caller ID, and the user ID of the callee IE with the stored callee ID.
2) may send the private call release message in response to the request message.
3) may start the timer T3 relating to private call release retransmission.
4) may enter the S3 state 240.

Private Call Release Retransmission

When in the S3 state 240, the timer T3 relating to private call release retransmission expires 241, the terminal 100:

1) may generate a private call release message. In this regard, the private call release message may be specified to set the call identifier IE to the stored call identifier, the user ID of the caller IE with the stored caller ID, and the user ID of the callee IE with the stored callee ID.
2) may send the private call release message.
3) may start the timer T3 relating to private call request retransmission.
4) may remain in the S3 state 240.

No Response to Private Call Release

In the S3 state 240, when the timer T3 relating to private call request retransmission expires for a configurable number of times 243, the terminal 100:

1) may terminate the media session.
2) may start the timer T7 relating to waiting for any message with the same call identifier.
3) may enter the SI state 220.

Acknowledging Private Call Release

When in the S4 state 250 or the S6 state 270 or the SI state 220, a private call release message is received 255 or 275 or 221, the terminal 100:

1) may generate a private call release acknowledgement message. In this regard, the private call release acknowledgement message may be specified to set the call identifier IE to the stored call identifier, the user ID of the caller IE with the stored caller ID, and the user ID of the callee IE with the stored callee ID.
2) may send the private call release acknowledgement message,
3) may terminate the media session for a private call.
4) may start the timer T7 relating to waiting for any message with the same call identifier when the current state is the S4 state 250.
5) may restart the timer T7 relating to waiting for any message with the same call identifier when the current state is the SI state 220,
6) may enter the SI state 220 when the current state is the S4 state 250 or the S6 state 270.

Private Call Release Acknowledged

When in the S3 state 240, a private call release acknowledgement message to the private call release message is received 243, the terminal 100:

1) may stop the timer T3 relating to private call release retransmission.
2) may terminate the media session.
3) may start the timer T7 relating to waiting for any message with the same call identifier.
4) may enter the SI state 220.

Implicit Call Release

When in the S4 state 250 or the S6 state 270, the timer T5 relating to call release expires 255 or 275, the terminal 100:

1) may terminate the media session.
2) may notify the user about the call release.
3) may start the timer T7 relating to waiting for any message with the same call identifier.
4) may enter the SI state 220.

End of Private Call with Same Call Id

When in the SI state 220, the timer T7 relating to waiting for any message with the same call identifier expires 225, the terminal 100:

1) may clear the stored call identifier.
2) may enter the S0 state 210.

Figure 3:
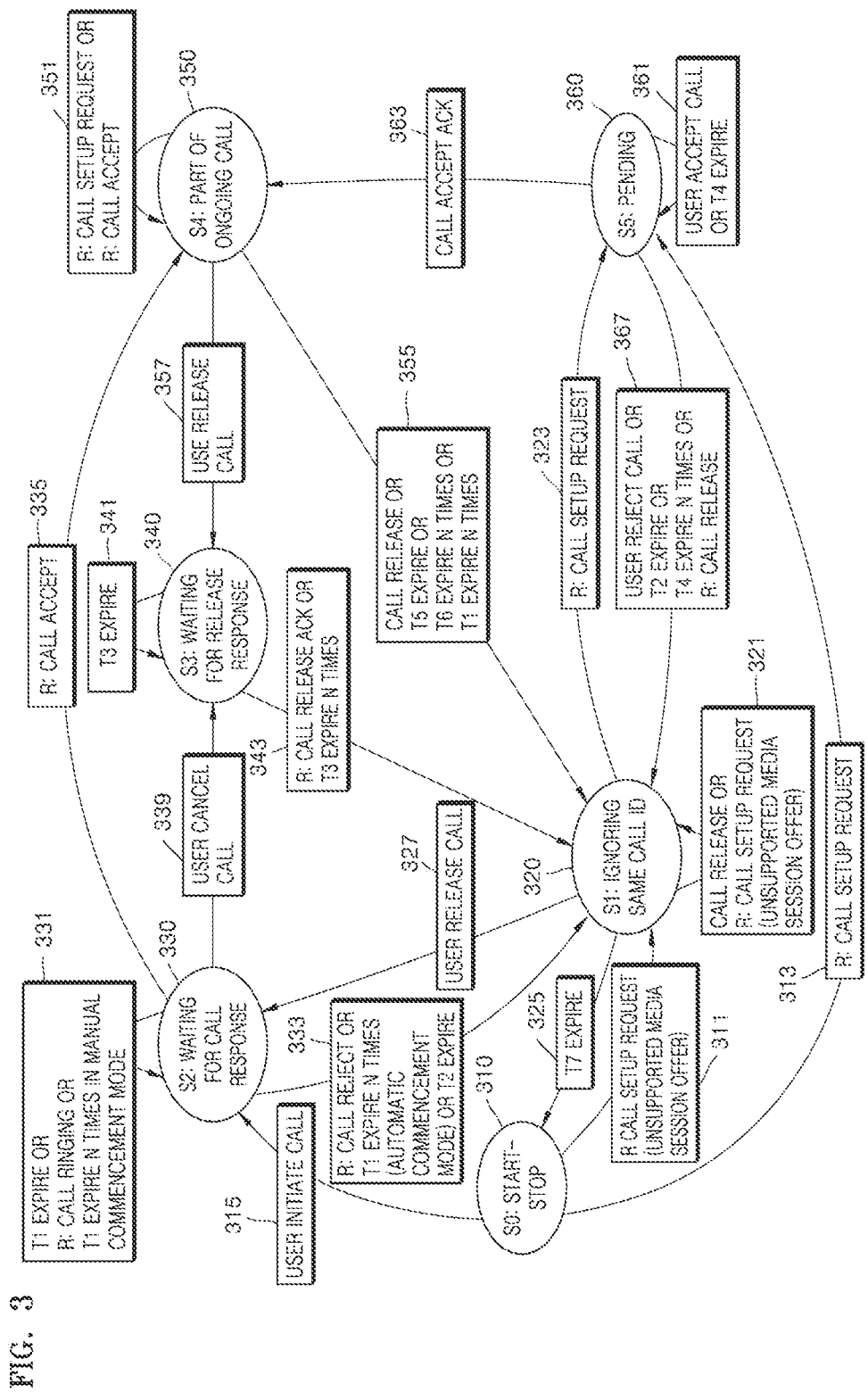
FIG. 3 is a state diagram for explaining a method performed by a terminal of performing communication with another terminal, according to an embodiment.

FIG. 3 is a state diagram for explaining a method performed by the terminal 100 of performing communication with another terminal, according to an embodiment.

In the present embodiment, a start-stop state 310 (hereinafter referred to as S0 state) may represent a state in which no call control terminal exists, and an ignoring same call id state 320 (hereinafter referred to as S1 state) may represent a state in which UE is not part of an ongoing private call.

Also, a wait for call response 330 (hereinafter referred to as S2 state) may represent a state in which the UE has sent a private call setup request message and is waiting for a response, a private call accept or private call reject message. A wait for release response 340 (hereinafter referred to as S3 state) may represent a state in which the UE has sent a private call release message and is waiting for a private call release acknowledgement message.

Also, a part of ongoing call 350 hereinafter referred to as S4 state) may represent a state in which the UE is part of an ongoing private call. A pending state 360 (hereinafter referred to as S5 state) may represent a state in which the UE has presented a notification to the user for the received private call setup request message and is waiting for a user indication.

<Private Call Setup>
Initiating a Private Call

According to an embodiment, when in the S0 state 310 or the SI state 320, an indication from the terminal user to initiate a private call is received 315 or 327, the terminal 100:

1) may generate and store a call identifier as a random number uniformly distributed between 0 and 65536.
2) may store own terminal user ID as a caller ID.
3) may store the terminal user ID of a callee as a callee ID.
4) may store an 'automatic commencement mode' as a commencement mode, if requested. Otherwise, the terminal 100 may store a 'manual commencement mode' as the commencement mode.
5) may store a requested call type as a call type.
6) may store 'true' as sent floor control indication, if requested. Otherwise, the terminal 100 store 'false' as floor control indication.
7) may store a current user location as a user location.
8) may generate and store an offered SDP, as defined above.
9) may generate a private call setup request message.

In this regard, the private call setup request message may be specified to set a call identifier IE with the stored call identifier, the user ID of the caller IE with the stored caller ID, and the user ID of the callee IE with the stored callee ID. Also, the private call setup request message may be specified to set a commencement mode IE with a stored commencement mode, the call type IE with a stored call type, and a use floor control indication IE with a stored sent floor control indication. Also, the private call setup request message set a SDP IE with a stored offered SDP. Also, when the stored call type IE is an emergency private call, the private call setup request message may be specified to set a user location IE with a stored user location.

10) may send the private call setup request message towards other terminal 100.

11) may start a timer T1 relating to private call request retransmission.

12) may enter the S2 state 330.

Private Call Setup Request Retransmission

When in the S2 state 330, the timer T1 relating to private call request retransmission expires 331, the terminal 100:

1) may update the stored user location with a current user location.

2) may generate a private call setup request message. In this regard, the private call setup request message may be specified to set the call identifier IE with the stored call identifier, the user ID of the caller IE with the stored caller ID, and the user ID of the callee IE with the stored callee ID. The private call setup request message may also set the commencement mode IE with the stored commencement mode, the call type IE with the stored call type, and the use floor control indication with the stored floor control indication. The private call setup request message may also set the SDP IE with the stored offered SDP. When the stored call type IE is an emergency private call, the private call setup request message may also set the user location IE with the stored user location.

3) may send the private call setup request message towards other terminal 100.

4) may start the timer T1 relating to private call request retransmission.

5) may remain in the S2 state 330.

Ringing Notification to the User

When in the S2 state 330, a private call ringing message is received 331, the terminal 100:

1) may notify the user that the private call ringing message is received.

2) may remain in the S2 state 330.

No Response to a Private Call Setup Request with the Automatic Commencement Mode In the S2 state 330, when the timer T1 relating to private call request retransmission expires for a configurable number of times and the stored commencement mode is the automatic commencement mode 331, the terminal 100:

1) may start a timer T7 relating to waiting for any message with the same call identifier.

2) may notify the user about unreachability of a called party.

3) may enter the SI state 320.

No Response to the Private Call Setup Request with the Manual Commencement Mode

When in the S2 state 330, the timer T1 relating to private call request retransmission expires for a configurable number of times and the stored commencement mode is the manual commencement mode 331, the terminal 100:

1) may start a timer T2 relating to waiting for call response message.

2) may remain in the S2 state 330.

No Response to the Private Call Setup Request after Waiting for User Acknowledgement When in the S2 state 330, the timer T2 relating to waiting for call response message expires 333, the terminal 100:

1) may start the timer T7 relating to waiting for any message with the same call identifier.

2) may notify the user about unreachability of the called party.

3) may enter the SI state 320.

Private Call Setup Request Rejected

When in the S2 state 330, a private call reject message in response to the private call setup request message with the same call identifier and with a reason IE set to 'reject' is received 333, the terminal 100:

1) may stop the timer T1 relating to call setup retransmission, when the timer T1 is running.

2) may stop the timer T2 relating to waiting for call response message when the timer T2 is running.

3) may start the timer T7 relating to waiting for any message with the same call identifier.

4) may notify the user about call rejection.

5) may enter the SI state 320.

Private Call Setup Request Accepted

In the S2 state 330, when a stored call type is a private call, and a private call accept message is received in response to the private call setup request message with the same call identifier 335, the terminal 100:

1) may store the use floor control indication IE received in the private call accept message as a received floor control indication.

2) may generate a private call accept acknowledgement message. In this regard, the private call accept acknowledgement message may be specified to set the call identifier IE to the stored call identifier, the user ID of the caller IE with the stored caller ID, and the user ID of the callee IE with the stored callee ID.

3) may send the private call accept acknowledgement message in response to the request message.

4) may stop the timer T1 relating to call setup retransmission when the timer T1 is running.

5) may stop the timer T2 relating to waiting for call response message when the timer T2 is running.

6) may establish a media session based on the SDP body of a private call.

7) may start floor control as a terminating floor participant when both the stored received floor control indication and sent floor control indication are set to "true".

8) may start a timer T5 relating to call release.

9) may enter the S4 state 350 and create call type state machine.

User Cancels the Private Call Setup Request

When in the S2 state 330 an indication from the user to cancel the private call request is received 339, the terminal 100:

1) may generate a private call release message. In this regard, the private call release message set the call identifier IE to the stored call identifier, the user ID of the caller IE with stored caller ID, and the user ID of the callee IE with the stored callee ID.

2) may send the private call release message in response to the request message.

3) may start a timer T3 relating to private call release retransmission.

4) may enter the S3 state 340.

Reject to Private Call Setup Request

When in the S2 state 330, a private call reject message with the reason IE is received 333, the terminal 100:

1) may stop the timer T1 relating to call setup retransmission when the timer T1 is running.

2) may stop the timer T2 relating to waiting for call response message when the timer T2 is running.

3) may start the timer T7 relating to waiting for any message with the same call identifier,
4) may notify the user about a reason to reject invitation from a receiving user.
5) may enter the S1 state 320.

<Private Call Setup in Automatic Commencement Mode>
Unable to Establish Media When in the S0 state 310 or in the S1 state 320, the private call setup request message with a call identifier IE different from the stored call identifier is received and a media session declared in the SDP body of the private call setup request message is not established 311 or 321, the terminal 100: For example, it may be determined whether the media session is established according to whether a specific port, a specific codec, or the Ike required for receiving media is supported. The media session may not be established when a port and codec of the terminal 100 do not match the specific port and the specific codec required for receiving media.

1) may store the call identifier IE in the received message as a call identifier.
2) may store the user ID of the caller IE in the received private call setup request message as a caller ID.
3) may store own user ID as a callee ID.
4) may generate a private call reject message. In this regard, the private call reject message may be specified to set the call identifier IE to the call identifier, the user ID of the callee IE with the stored callee ID, and the user ID of the caller IE with the stored caller ID. Also, the private call reject message may be specified to set the reason IE as 'reject'.
5) may send the private call reject message in response to the request message.
6) may start the timer T7 relating to waiting for any message with the same call identifier when the current state is the S0 state 310.
7) may restart the timer T7 relating to wafting for any message with the same call identifier when the current state is the S1 state 320.
8) may enter the S1 state 320 when the current state is the S0 state 310.

Responding to Private Call Setup Request when not Participating in the Ongoing Call When in the S0 state 310 the private call setup request message with the commencement mode IE set to the automatic commencement mode and the call identifier IE different from the stored call identifier is received and the media session declared in the SDP body of the private call setup request message is established 313, the terminal 100:

1) may store the call identifier IE in the received message as the call identifier.
2) may store the call type IE in the received message as the call type.
3) may store the user ID of the caller IE in the received private call setup message as the caller ID.
4) may store own user ID as the callee ID.
5) may store the use floor control indication IE in the received message as received floor control indication. When the received floor control indication is 'true', the terminal 100 may set and store the sent floor control indication as requested.
6) may generate and store an SDP.
7) may generate a private call accept message. In this regard, the private call accept message may be specified to set the call identifier IE to the stored call identifier, the user ID of the callee IE with the stored callee ID, and the user ID of the caller IE with the stored caller ID. The private call accept message may be specified to set the use floor control indication IE with the stored sent floor control indication. The private call accept message may be specified to set the SDP IE with the stored answer SDP,
8) may send the private call accept message in response to the request message.
9) may establish the media session based on the SDP body of the private call.
10) may start floor control as the terminating floor participant when both the stored received floor control indication and sent floor control indication is set to 'true'.
11) may start a timer T4 relating to private call accept retransmission.
12) may enter the S5 state 360, Private Call Accept Retransmission When in the S5 state 360 the timer T4 relating to private call accept retransmission expires 361, the terminal 100:

1) may generate a private call accept message. In this regard, the private call accept message may be specified to set the call identifier IE to the stored call identifier, the user ID of the callee IE with the stored callee ID, and the user ID of the caller IE with the stored caller ID. The private call accept message may be specified to set the use floor control indication IE with the stored sent floor control indication. The private call accept message may be specified to set the SDP IE with the stored answer SDP.
2) may send the private call accept message in response to the request message.
3) may start the timer T4 relating to private call accept retransmission.
4) may remain in the S5 state 360.

Establishing the Call

When in the S5 state 360 the stored call type is a private call, and the private call accept acknowledgement message is received or RTP media is received from an originating user 363, the terminal 100:

1) may stop the timer T4 relating to private call accept retransmission.
2) may notify the user of call establishment
3) may start floor control as the terminating floor participant when both the stored sent floor control indication and received floor control indication are 'true'.
4) may start the timer T5 relating to call release.
5) may enter the S4 state 350 and create call type state machine.

Call Failure

In the S5 state 360, when the timer T4 relating to private call accept retransmission expires for a configurable number of times 367, the terminal 100:

1) may notify the user of a call failure.
2) may start the timer T7 relating to waiting for any message with the same call identifier.
3) may enter the S1 state 320.

Responding to the Private Call Setup Request when Participating in the Ongoing Call When in the S4 state 350 a private call setup request message is received 351, the terminal 100:

1) may store a user ID of a caller IE of the private call setup request message as the caller ID.
2) may store own user ID as the callee ID.
3) may generate a private call reject message. In this regard, the private call reject message may be specified to set the call identifier IE to the stored call identifier, the user ID of the callee IE with the stored callee ID, and the user ID of the caller IE with the stored caller ID. The private call reject message may also set the reason IE as 'busy'.
4) may send the private call reject message in response to the request message.
5) may notify the other incoming call to the user.
6) may remain in the S4 state 350.

<Private Call Setup in the Manual Commencement Mode>

Notifying User of a Private Call Setup Request

According to an embodiment, when in the S0 state 310 or the S1 state 320 the private call setup request message with the commencement mode IE set to the manual commencement mode and the call identifier IE different from the stored call identifier is received 313 or 323, the terminal 100:

1) may store the call identifier IE in the received message as the call identifier.
2) may store the call type IE in the received message as the call type.
3) may store the user ID of the caller IE as received in the private call setup request as the caller ID.
4) may store own user ID as the callee
5) may generate a private call ringing message. In this regard, the private call ringing message may be specified to set the call identifier IE to the stored call identifier, the user ID of the callee IE with the stored callee ID, and the user ID of the caller IE with the stored caller ID.
6) may send the private call ringing message in response to the request message.
7) may start the timer T2 relating to waiting for call response message.
8) may notify the incoming call to the user.
9) may enter the S5 state 360.

No Response from the User

When in the S5 state 360 the timer T2 relating to waiting for call response message expires 367, the terminal 100:

1) may generate a private call reject message.
2) may send the private call reject message in response to the request message. In this regard, the private call reject message may be specified to set the call identifier IE to the stored call identifier, the user ID of the callee IE with the stored callee ID, and the user ID of the caller IE with the stored caller ID. The private call reject message may be specified to set the reason IE as 'no answer'.
3) may start the timer T7 relating to waiting for any message with the same call identifier.
4) may enter the S1 state 320.

User Accepts the Private Call Setup Request

When in the S5 state 360 the indication is received from the user to accept the incoming private call 361, the terminal 100:

1) may store the use floor control indication IE in the received message as the received floor control indication. When the received floor control indication is 'true', the terminal 100 may set and store the sent floor control indication as requested.
2) may generate and store the answer SDP.
3) may generate a private call accept message. In this regard, the private call accept message may be specified to set the call identifier IE to the stored call identifier, the user ID of the callee IE with the stored callee ID, and the user ID of the caller IE with the stored caller ID. The private call accept message may also set the use floor control indication IE with the stored sent floor control indication. The private call accept message may also set the SDP IE with the stored answer SDP.
4) may send the private call accept message in response to the request message.
5) may establish the media session based on the SDP body of the private call.
6) may start floor control as the terminating floor participant when both the stored received floor control indication and sent floor control indication is set to 'true'.
7) may start the timer T4 relating to private call accept retransmission.
8) may remain in the S5 state 360.

<Private Call Accept Retransmission>

When in the S5 state 360, the timer T4 relating to private call accept retransmission expires 361, the terminal 100:

1) may generate a private call accept message. The private call accept message may be specified to set the call identifier IE to the stored call identifier, the user ID of the callee IE with the stored callee ID, and the user ID of the caller IE with the stored caller ID. The private call accept message may also be specified to set the use floor control indication IE with the stored sent floor control indication. The private call accept message may also be specified to set the SDP IE with the stored answer SDP.
2) may send the private call accept message in response to the request message.
3) may start the timer T4 relating to private call accept retransmission.
4) may remain in the S5 state 360.

Establishing the Call

When in the S5 state 360 the stored call type is the private call, a private call accept acknowledgement message is received or RTP media is received from the originating user 363, the terminal 100:

1) may stop the timer T4 relating to private call accept retransmission.
2) may notify the user of call establishment.
3) may start floor control as the terminating floor participant when both the stored sent floor control indication and received floor control indication are 'true'.
4) may start the timer T5 relating to call release.
5) may enter the S4 state 350 and create call type state machine.

Call Failure

In the S5 state 360, when the timer T4 relating to private call accept retransmission expires for a configurable number of times 367, the terminal 100

1) may notify the user of the call failure.
2) may start the timer T7 relating to waiting for any message with the same call identifier.
3) may enter the SI state 320.

User Rejects the Private Call Setup Request

When in the S5 state 360, an indication is received from the user to reject the incoming private call 367, the terminal 100:

1) may generate a private call reject message. In this regard, the private call reject message may be specified to set the call identifier IE to the stored call identifier, the user ID of the callee IE with the stored callee ID, and the user ID of the caller IE with the stored caller D. The private call reject message may be specified to set the reason IE as 'reject'.
2) may send the private call reject message in response to the request message.
3) may start the timer T7 relating to waiting for any message with the same call identifier.
4) may enter the SI state 320.

Caller Cancels the Private Call Setup Request

When in the S5 state 360 or the SI state 320, a private call release message is received 367 or 321, the terminal 100:
1) may generate a private call release acknowledgement message. In this regard, the private call release acknowledgement message may be specified to set the call identifier IE to the stored call identifier, the user ID of the callee IE with the stored callee ID, and the user ID of the caller IE with the stored caller ID.
2) may send the private call release acknowledgement message in response to the request message.
3) may start the timer T7 relating to waiting for any message with the same call identifier when a current state is the S5 state 360.
4) may restart the timer T7 relating to waiting for any message with the same call identifier when the current state is the S5 state 360.
5) may enter the SI state 320 when the current state is the S5 state 360.

Responding to Private Call Setup Request when Participating in the Ongoing Call

When in the S4 state 250 or the S6 state 270, a private call setup request message is received, the terminal 100:
1) may store a call identifier IE of the private call setup request message as a waiting call identifier.
2) may store a user ID of a call IE in the private call setup request message as a waiting caller ID.
3) may generate a private call reject message. In this regard, the private call reject message may be specified to set the call identifier IE to the stored waiting call identifier, the user ID of the callee IE with the stored callee ID, and the user ID of the caller IE with the stored waiting caller ID. The private call reject message may be specified to set the reason IE as 'busy'.
4) may send the private call reject message in response to the request message.
5) may notify the other incoming call to the user.

<Private Call Release>

Releasing a Private Call

When in the S4 state 350, an indication is received from the user to release the private call is received 357, the terminal 100:
1) may generate a private call release message. In this regard, the private call release message may be specified to set the call identifier IE to the stored call identifier, the user ID of the caller IE with the stored caller ID, and the user ID of the callee IE with the stored callee ID.
2) may send the private call release message in response to the request message.
3) may start the timer T3 relating to private call release retransmission.
4) may enter the S3 state 340.

Private Call Release Retransmission

When in the S3 state 340, the timer T3 relating to private call release retransmission expires 341, the terminal 100:
1) may generate a private call release message. In this regard, the private call release message may be specified to set the call identifier IE to the stored call identifier, the user ID of the caller IE with the stored caller ID, and the user ID of the callee IE with the stored callee ID.
2) may send the private call release message.
3) may start the timer T3 relating to private call request retransmission.
4) may remain in the S3 state 340.

No Response to Private Call Release

In the S3 state 340, when the timer T3 relating to private call request retransmission expires for a configurable number of times 343, the terminal 100:
1) may terminate the media session.
2) may start the timer T7 relating to waiting for any message with the same call identifier.
3) may enter the SI state 320.

Acknowledging Private Call Release

When in the S4 state 350 or the SI state 320, a private call release message is received 355 or 321, the terminal 100:
1) may generate a private call release acknowledgement message. In this regard, the private call release acknowledgement message may be specified to set the call identifier IE to the stored call identifier, the user ID of the caller IE with the stored caller ID, and the user ID of the callee IE with the stored callee ID.
2) may send the private call release acknowledgement message.
3) may terminate the media session for a private call.
4) may start the timer T7 relating to waiting for any message with the same call identifier when the current state is a S4.1 state (in-progress private call) of FIG. 4 or S4.2 state (in-progress emergency private call) of FIG. 4.
5) may restart the timer T7 relating to waiting for any message with the same call identifier when the current state is the SI state 320.
6) may enter the SI state 320.

Private Call Release Acknowledged

When in the S3 state 340, a private call release acknowledgement message to the private call release message is received 343, the terminal 100:
1) may stop the timer T3 relating to private call release retransmission.
2) may terminate the media session.
3) may start the timer T7 relating to waiting for any message with the same call identifier.
4) may enter the SI state 320.

Implicit Call Release

When in the S4 state 350, the timer T5 relating to call release expires 355, the terminal 100:
1) may terminate the media session.
2) may notify the user about the call release.
3) may start the timer T7 relating to waiting for any message with the same call identifier.
4) may enter the SI state 320.

End of Private Call With Same Call Id

When in the SI state 320, the timer T7 relating to waiting for any message with the same call identifier expires 325, the terminal 100:
1) may clear the stored call identifier.
2) may enter the S0 state 310.

Meanwhile, according to an embodiment, the terminal 100 may discard an MONP message upon receiving the MONP message in a state where there is no handling specified for the MONP message. Also, the terminal 100 may ignore an indication upon receiving the indication from a user in a state where there is no handling specified for the indication. Also, the terminal 100 may ignore an expiration of a tinier upon the expiration of the timer in a state where there is no handling specified for the expiration of the timer.

Figure 4:
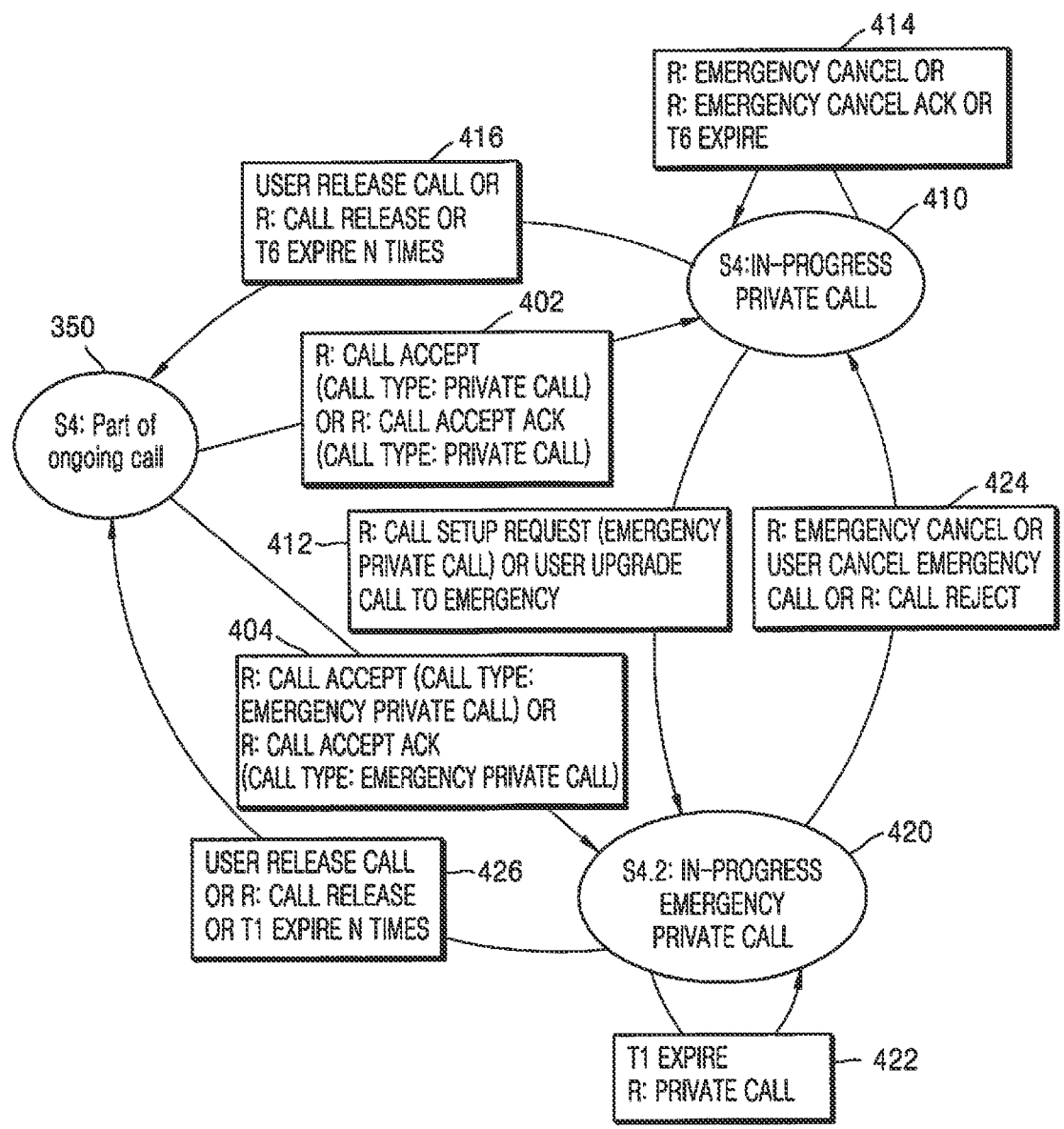
FIG. 4 is a state diagram for explaining a method of controlling a call type of a terminal, according to an embodiment.

FIG. 4 is a state diagram for explaining a method of controlling a call type of the terminal 100, according to an embodiment.

Referring to FIG. 4, the state diagram may be generated per MCPTT group ID.

In the present embodiment, an in-progress private call 410 (hereinafter referred to as S4.1 state) may represent a state where an UE is part of an in-progress private call. Also, an in-progress emergency private call 420 (hereinafter referred to as S4.1 state) may represent a state where the UE is part of an in-progress emergency private call.

According to an embodiment, the terminal 100 may set ProSe Per-Packet priority since the state diagram is disclosed. For example, when a stored call type is a private call, the terminal 100 may set the priority corresponding to the private call when passing a message for transmission to a ProSe protocol layer. For another example, when the stored call type is an emergency private call, the terminal 100 may set the priority corresponding to the emergency private call when passing the message for transmission to the ProSe protocol layer.

Also, since the state diagram is disclosed, the terminal 100 may enter the S4.1 state 410 when the stored call type is the private call 402 or may enter the S4.2 state 420 when the stored call type is the emergency private call 404.

When in the S4.1 state 410, an indication is received from the user to upgrade the call to emergency 412, the terminal 100:
1) may generate and store an emergency offer SDP.
2) may update a caller ID as own user ID.
3) may update a callee ID as a user ID of the other user.
4) may store a current user location as a user location.
5) may generate a private call setup request message. In this regard, the private call setup request message may be specified to set the call identifier IE with the stored call identifier, set the user ID of the caller IE with the stored caller ID, and the user ID of the callee IE with the stored callee ID. The private call setup request message may also be specified to set a commencement mode IE with an automatic commencement mode, set a call type IE with an emergency private call type, and a use floor control indication IE with the stored sent floor control indication. The private call setup request message may also be specified to set the SDP IE with the emergency offer SDP. The private call setup request message may also be specified to set the user location IE with the user location.
6) may set the ProSe Per-Packet priority corresponding to the emergency private call when passing the message for transmission to the ProSe protocol layer when the stored call type is the emergency private call.
7) may send the private call setup request message towards other terminal 100.
8) may start a timer T1a relating to private call request retransmission.
9) may enter the S4.2 state 420.

When in the S4.2 state 420, the timer T1 relating to private call request retransmission expires 422, the terminal 100:
1) may update the stored user location with a current user location.
2) may generate a private call setup request message. In this regard, the private call setup request message may be specified to set the call identifier IE with the stored call identifier, the user ID of the caller IE with the stored caller ID, and the user ID of the callee IE with the stored callee ID. The private call setup request message may also be specified to set the commencement mode IE with the automatic commencement mode, the call type IE with the emergency private call, and the use floor control indication IE with the stored sent floor control indication. The private call setup request message may also be specified to set the SDP IE with the stored emergency offer SDP. The private call setup request message may also be specified to set the user location IE with the stored user location.
3) may send the private call setup request message towards other terminal 100,
4) may start the timer T1 relating to private call request retransmission.
5) may remain in the S4.2 state 420.

Emergency Private Call Setup Request Accepted

When in the S4.2 state 420, a private call accept message is received in response to the private call setup request message with the same call identifier 422, the terminal 100:
1) may store the use floor control indication IE received in the private call accept message as received floor control indication.
2) may generate a private call accept acknowledgement message. In this regard, the private call accept acknowledgement message may be specified to set the call identifier IE to the stored call identifier, the user ID of the caller IE with the stored caller ID, and the user ID of the callee IE with the stored callee ID.
3) may send the private call accept acknowledgement message in response to the request message.
4) may stop the timer T1a when the timer T1 relating to private call setup retransmission is running.
5) may stop a timer T2a when the timer T2 relating to waiting for private call response message is running.
6) may start floor control as a terminating floor participant when both the stored received floor control indication and sent floor control indication are set to 'true'.
7) may start the timer T5 relating to call release when a current state is the S2 state (waiting for call response) of FIG. 3.
8) may remain in the S4.2 state 420.

Emergency Private Call Setup Request Rejected

When in the S4.2 state 420, a private call reject message in response to the private call setup request message with the same call identifier and reason IE set to 'reject' is received 424, the terminal 100:
1) may stop the timer T1 relating to call setup retransmission when the timer T1 is running.
2) may notify the user about call rejection.
3) may set the priority corresponding to the private call when passing the message for transmission to the ProSe protocol layer when the stored call type is the private call.
4) may enter the S4.1 state 410.

No Response to Emergency Private Call Setup Request

In the S4.2 state 420, when the timer T1 relating to private call request retransmission expires for a configurable number of times 426, the terminal 100:
1) may start the timer T7 relating to wafting for any message with the same call identifier.
2) may notify the user about unreachability of the called party.
3) may release the call type control state machine.

Responding to emergency private call setup request when participating in the ongoing call When in the S4.1 state 410, a private call setup request message with the same call identifier IE and the call type IE with the emergency private call is received 412, the terminal 100:
1) may generate and store an emergency answer SDP when the emergency answer SDP is not generated already.

2) may update the caller ID with the user ID of the caller IE as received in the private call setup request message.
3) may update the callee ID with own user ID.
4) may update the received floor control indication with the use floor control indication IE as received in the private call setup request message.
5) may generate a private call accept message. In this regard, the private call accept message may be specified to set the call identifier IE to the stored call identifier, the user ID of the callee IE with the stored callee ID, and the user ID of the caller IE with the stored caller ID. The private call accept message may also be specified to set the use floor control indication with the stored sent floor control indication. The private call accept message may also be specified to set the SDP IE with the stored emergency answer SDP.
6) may set the ProSe Per-Packet priority corresponding to the emergency private call when passing the message for transmission to the ProSe protocol layer when the stored call type is the emergency private call.
7) may send the private call accept message to another terminal 100.
8) may start floor control as a terminating floor participant when both the stored received floor control indication and sent floor control indication are set to 'true',
9) may enter the S4.2 state 420.

User Cancels the Emergency Private Call

When in the S4.2 state 420, an indication is received from a caller of the emergency private call, to cancel the emergency private call 424, the terminal 100:
1) may generate a private emergency call cancel message. In this regard, the private emergency call cancel message may be specified to set the call identifier IE to the stored call identifier, the user ID of the caller IE with the stored caller, and the user ID of the callee IE with the stored callee.
2) may send the private emergency call cancel message,
3) may start the timer T6 relating to emergency private call cancel retransmission.
4) may enter the S4.1 state 410.

Emergency Private Call Cancel Retransmission

When in the S4.1 state 410, the timer T6 relating to emergency private call cancel retransmission expires, the terminal 100:
1) may generate a private emergency call cancel message. In this regard, the private emergency call cancel message may be specified to set the call identifier IE to the stored call identifier, the user ID of the caller IE with the stored caller ID, and the user ID of the callee IE with the stored callee ID.
2) may send the private emergency call cancel message.
3) may start the timer T6 relating to emergency private call cancel retransmission.
4) may remain in the S4.1 state 410.

Emergency Private Call Cancel Accepted

When in the S4.1 state 410, a private emergency call cancel acknowledgement message in response to the private emergency call cancel message with the same call identifier is received 414, the terminal 100:
1) may stop the timer T6 relating to emergency private call cancel retransmission when the timer T6 is running.
2) may establish a media session based on the SDP body of private call before updated.

3) may set the priority corresponding to the private call when passing the message for transmission to the ProSe protocol layer when the stored call type is the private call.
4) may remain in the S4.1 state 410.

No Response to Emergency Private Call Cancel

In the S4.1 state 410, when the timer T6 relating to emergency private call cancel retransmission expires for a configurable number of times 416, the terminal 100:
1) may start the timer T7 relating to waiting for any message with the same call identifier.
2) may notify the user about unreachability of the called party.
3) may release the call type control state machine.

Responding to Emergency Private Call Cancel

When in the S4.1 state 410 or the S4.2 state 420, a private emergency call cancel message with the same call identifier IE is received 414 or 424, the terminal 100:
1) may generate a private emergency call cancel acknowledgement message. In this regard, the private emergency call cancel acknowledgement message may be specified to set the call identifier IE to the stored call identifier, the user ID of the callee IE with own user ID, and the user ID of the caller IE with the user ID of the caller IE.
2) may send the private emergency call cancel acknowledgement message.
3) may set the priority corresponding to the private call when passing the message for transmission to the ProSe protocol layer when the stored call type is the private call.
4) may enter the S4.1 state 410 when a current state is the S4.2 state 420.

Meanwhile, according to an embodiment, the terminal 100 may discard an MONP message upon receiving the MONP message in a state where there is no handling specified for the MONP message. Also, the terminal 100 may ignore an indication upon receiving the indication from a user in a state where there is no handling specified for the indication. Also, the terminal 100 may ignore an expiration of a timer upon the expiration of the timer in a state where there is no handling specified for the expiration of the timer.

Figure 5:
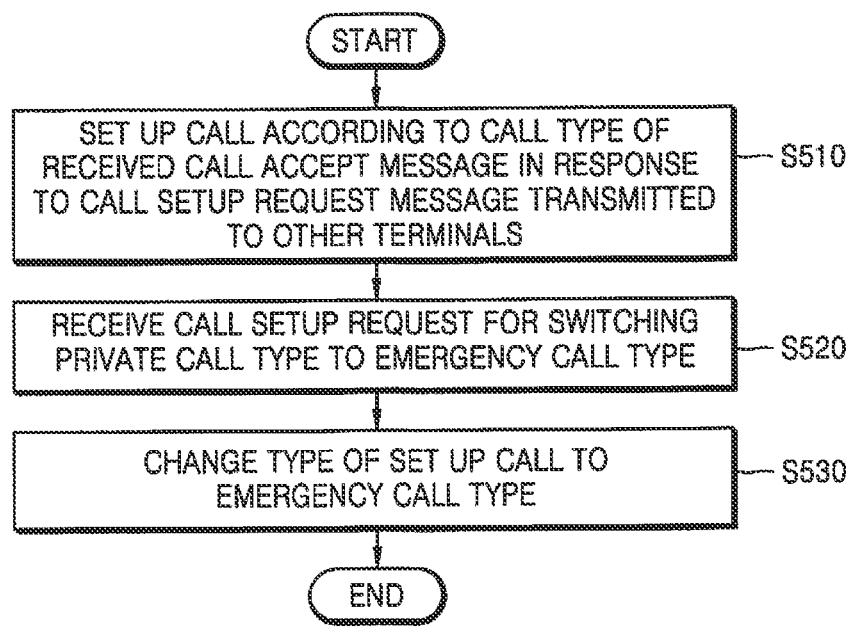
FIG. 5 is a flowchart for explaining a method performed by a terminal of switching a call type, according to an embodiment.

FIG. 5 is a flowchart for explaining a method performed by the terminal 100 of switching a call type, according to an embodiment.

In operation S510, the terminal 100 may set up a call according to a call type of a received call accept message in response to a call setup request message transmitted to the other terminals 10 and 20.

According to an embodiment, the terminal 100 providing a MCPTT service may receive the call accept message. The type of the call accept message may be a private call or an emergency private call. According to another embodiment, the terminal 100 providing the MCPTT service may receive a call accept acknowledgement message. The type of the call accept acknowledgement message may be a private call or an emergency private call.

When the type of the received call setup message is the private call, the terminal 100 may set up the private call. According to another example, when the type of the received call setup message is the emergency private call, the terminal 100 may set up the emergency private call.

Meanwhile, in the present embodiment, it is assumed that the private call is set up since the call accept message of the private call type is received in the terminal 100.

In operation S520, the terminal 100 may receive a call setup request for switching a call type to the emergency call type.

According to an embodiment, the terminal 100 may receive an emergency private call setup request message requesting to change the type of the set up call to the emergency private call from another terminal. According to another embodiment, the terminal 100 may receive an instruction of a user requesting to switch the call type from the private call to the emergency call.

In operation S530, the terminal 100 may change the type of the set up call to the emergency call type since the call setup request is received.

Meanwhile, in the present embodiment, since the call type of the terminal 100 is changed to the emergency call type, the terminal 100 may enter the S4.2 state 420 described above with reference to FIG. 4.

FIG. 6 is a diagram for explaining content 600 included in a private call setup request message, according to an embodiment.

According to an embodiment, the private call setup request message may be sent by the terminal 100 to the other terminals 10 and 20 to request setup of a private call.

Referring to FIG. 6, the content 600 included in the private call setup request message may include information about IE 610 for a private call setup request, type/reference 620 with respect to the respective IE 610, presence 630, format 640, and length 650.

The IE 610 for the private call setup request may include a private call setup request message identity, a call identifier, a commencement mode, a MCPTT user ID of a caller, a MCPTT user ID of a callee, a call type, a use floor control indication, an SDP, and a user location.

According to an embodiment, the private call setup request message identity may include a message type. For example, the message type of a private call setup request message may be set to 'PRIVATE CALL SET UP REQEUST'.

The information about the type/reference 620 with respect to the respective IE 610 will be described in more detail with reference to FIGS. 15 through 25 below.

Meanwhile, the presence 630 of the IE 610 for the private call setup request may present whether an IE is mandatory M or optional 0. Also, the format 640 of the IE 610 for the private call setup request may include may be set to V or LV-E but this is merely an embodiment. The format 640 of the IE 610 for the private call setup request may include is not limited to the above-described example. Also, the length 650 of the IE 610 for the private call setup request may include may indicate a bit number used to present the IE 610. The length 650 of the IE 610 shown in FIG. 6 is merely an embodiment and is not limited thereto.

FIG. 7 is a diagram for explaining content 700 included in a private call ringing message, according to embodiment.

According to an embodiment, the private call ringing message may be automatically sent by the terminal 100 to the other terminals 10 and 20 in response to a private call setup request message. The private call ringing message indicates that the terminal 100 has presented an incoming call from another terminal (e.g. 10) and is awaiting a response of a user of the terminal 100.

Referring to FIG. 7, the content 700 included in the private call ringing message may include information about information element (IE) 710 of the private call ringing message, type/reference 720 with respect to the respective IE 710, presence 730, format 740, and length 750.

The IE 710 of the private call ringing message may include a private call ringing message identity, a call identifier, a MCPTT user ID of a caller, and a MCPTT user ID of a callee.

According to an embodiment, the private call ringing message identity may include a message type. For example, the message type of the private call ringing message may be set to 'PRIVATE CALL RINGING'.

Meanwhile, the type/reference 720 with respect to the respective IE 710 of the private call ringing message, the presence 730, the format 740, and the length 750 may be same as described with reference to FIG. 6 above.

FIG. 8 is a diagram for explaining content 800 included in a private call accept message, according to embodiment.

According to an embodiment, the private call accept message may be sent by the terminal 100 to the other terminals 10 and 29 in response to a private call setup request message when a user accepts the call.

Referring to FIG. 8, the content 800 included in the private call accept message may include information about information element (IE) 810 of the private call accept message, type/reference 820 with respect to the respective IE 810, presence 830, format 840, and length 850.

The IE 810 of the private call accept message may include a private call accept message identity, a call identifier, a MCPTT user ID of a caller, a MCPTT user ID of a callee, use floor control indication, and an SDP.

According to an embodiment, the private call accept message identity may include a message type. For example, the message type of the private call accept message may be set to 'PRIVATE CALL ACCEPT'.

Meanwhile, the type/reference 820 with respect to the respective IE 810 of the private call accept message, the presence 830, the format 840, and the length 850 may be same as described with reference to FIG. 6 above.

FIG. 9 is a diagram for explaining content 900 included in a private call reject message, according to an embodiment.

According to an embodiment, the private call reject message may be sent by the terminal 100 to the other terminals 10 and 20 in response to a private call setup request message when a user rejects the call. The private call reject message indicates that the call setup request is rejected.

Referring to FIG. 9, the content 900 included in the private call reject message may include information about information element (IE) 910 of the private call reject message, type/reference 920 with respect to the respective IE 910, presence 930, format 940, and length 950.

The IE 910 of the private call reject message may include a private call reject message identity, a call identifier, a MCPTT user ID of a caller, a MCPTT user ID of a callee, and a reason.

According to an embodiment, the private call reject message identity may include a message type. For example, the message type of the private call reject message may be set to 'PRIVATE CALL REJECT'.

Meanwhile, the type/reference 920 with respect to the respective IE 910 of the private call reject message, the presence 930, the format 940, and the length 950 may be same as described with reference to FIG. 6 above.

FIG. 10 is a diagram for explaining content 1000 included in a private call release message, according to an embodiment.

According to an embodiment, the private call release message may be sent by the terminal 100 to the other terminals 10 and 20 to terminate an ongoing private call.

Referring to FIG. 10, the content 1000 included in the private call release message may include information about information element (IE) 1010 of the private call release message, type/reference 1020 with respect to the respective IE 1010, presence 1030, format 1040, and length 1050.

The IE 1010 of the private call release message may include a private call release message identity, a call identifier, a MCPTT user ID of a caller, and a MCPTT user ID of a callee.

According to an embodiment, the private call release message identity may include a message type. For example, the message type of the private call release message may be set to 'PRIVATE CALL RELEASE'.

Meanwhile, the type/reference 1020 with respect to the respective IE 1010 of the private call release message, the presence 1030, the format 1040, and the length 1050 may be same as described with reference to FIG. 6 above.

FIG. 11 is a diagram for explaining content 1100 included in a private call release acknowledgement message, according to an embodiment.

According to an embodiment, the private call release acknowledgement message may be sent by the terminal 100 to the other terminals 10 and 20 in response to a private call release message. The private call release acknowledgement message may be sent by the terminal 100 to the other terminals 10 and 20 to terminate an ongoing private call. The private call release acknowledgement message indicates that the terminal 100 has terminated the call.

Referring to FIG. 11, the content 1100 included in the private call release acknowledgement message may include information about information element (IE) 1110 of the private call release message, type/reference 1120 with respect to the respective IE 1110, presence 1130, format 1140, and length 1150.

The IE 1110 of the private call release acknowledgement message may include a private call release acknowledgement message identity, a call identifier, a MCPTT user ID of a caller, and a MCPTT user ID of a callee.

According to an embodiment, the private call release acknowledgement message identity may include a message type. For example, the message type of the private call release acknowledgement message may be set to 'PRIVATE CALL RELEASE ACK'.

Meanwhile, the type/reference 1120 with respect to the respective IE 1110 of the private call release acknowledgement message, the presence 1130, the format 1140, and the length 1150 may be same as described with reference to FIG. 6 above.

FIG. 12 is a diagram for explaining content 1200 included in a private call accept acknowledgement message, according to an embodiment.

According to an embodiment, the private call accept acknowledgement message may be sent by the terminal 100 to the other terminals 10 and 20 in response to a private call accept message. The other terminals 10 and 20 may acknowledge through the private call accept acknowledgement message that the terminal 100 has received the private call accept message.

Referring to FIG. 12, the content 1200 included in the private call accept acknowledgement message may include information about information element (IE) 1210 of the private call release message, type/reference 1220 with respect to the respective IE 1210, presence 1230, format 1240, and length 1250.

The IE 1210 of the private call accept acknowledgement message may include a private call accept acknowledgement message identity, a call identifier, a MCPTT user ID of a caller, and a MCPTT user ID of a callee.

According to an embodiment, the private call accept acknowledgement message identity may include a message type. For example, the message type of the private call accept acknowledgement message may be set to 'PRIVATE CALL ACCEPT ACK'.

Meanwhile, the type/reference 1220 with respect to the respective IE 1210 of the private call accept acknowledgement message, the presence 1230, the format 1240, and the length 1250 may be same as described with reference to FIG. 6 above.

FIG. 13 is a diagram for explaining content 1300 included in a private emergency call cancel message, according to an embodiment.

According to an embodiment, the private emergency call cancel message may be sent by the terminal 100 to the other terminals 10 and 20 to indicate termination of an emergency mode in a private call.

Referring to FIG. 13, the content 1300 included in the private emergency call cancel message may include information about information element (IE) 1310 of the private emergency call cancel message, type/reference 1320 with respect to the respective IE 1310, presence 1330, format 1340, and length 1350.

The IE 1310 of the private emergency call cancel message may include a private emergency call cancel message identity, a call identifier, a MCPTT user ID of a caller, and a MCPTT user ID of a callee.

According to an embodiment, the private emergency call cancel message identity may include a message type. For example, the message type of the private emergency call cancel message may be set to 'PRIVATE EMERGENCY CALL CANCEL'.

Meanwhile, the type/reference 1320 with respect to the respective IE 1210 of the private emergency call cancel message, the presence 1330, the format 1340, and the length 1350 may be same as described with reference to FIG. 6 above.

FIG. 14 is a diagram for explaining content 1400 included in a private emergency call cancel acknowledgement message, according to an embodiment.

According to an embodiment, the private emergency call cancel acknowledgement message may be sent by the terminal 100 to the other terminals 10 and 20 to indicate receipt of a private emergency call cancel message.

Referring to FIG. 14, the content 1400 included in the private emergency call cancel acknowledgement message may include information about information element (IE) 1410 of the private emergency call cancel acknowledgement message, type/reference 1420 with respect to the respective IE 1410, presence 1430, format 1440, and length 1450.

The IE 1410 of the private emergency call cancel acknowledgement message may include a private emergency call cancel acknowledgement message identity, a call identifier, a MCPTT user ID of a caller, and a MCPTT user ID of a callee.

According to an embodiment, the private emergency call cancel acknowledgement message identity may include a message type. For example, the message type of the private emergency call cancel acknowledgement message may be set to 'PRIVATE EMERGENCY CALL CANCEL ACK'.

Meanwhile, the type/reference 1420 with respect to the respective IE 1410 of the private emergency call cancel acknowledgement message, the presence 1430, the format 1440, and the length 1450 may be same as described with reference to FIG. 6 above.

FIG. 15 is a diagram for explaining IE coding and format of a MONP message 1520, according to an embodiment.

Referring to FIG. 15, a most significant bit (MSB) and a least significant bit (LSB) may be marked in a field 1510. The LSB is represented by the lowest numbered bit of the highest numbered octet of the field 1510. When the field extends over more than one octet, the order of bit values progressively decreases as the octet number increases.

Meanwhile, according to an embodiment, the MONP message 1520 may include a message type information element 1522 and other information elements 1524. The other information elements 1524 may be marked with required information other than a message type.

Also, unless specified otherwise in the MONP message 1520, a particular information element may not be present more than once in a given message. A sending entity (e.g. a terminal sending a message) may set value of a spare bit in the MONP message 1520 to zero. Also, a receiving entity (e.g. a terminal receiving a message) may ignore value of a spare bit in the MONP message 1520.

According to an embodiment, the sending entity may not set a value of an information element to a reserved value in the MONP message 1520. The receiving entity may also discard a message containing an information element set to a reserved value in the MONP message 1520.

FIG. 16 is a diagram for explaining a message type of a MONP message, according to an embodiment.

The terminal 100 may identify types of the MONP message based on a type of a received MONP message.

Referring to FIG. 16, content 1600 of the type of the MONP message may include any one of 'PRIVATE CALL SETUP REQUEST', 'PRIVATE CALL RINGING', 'PRIVATE CALL ACCEPT', 'PRIVATE CALL REJECT', 'PRIVATE CALL RELEASE', 'PRIVATE CALL RELEASE ACK', 'PRIVATE CALL BUSY', 'PRIVATE CALL NO ANSWER', and 'PRIVATE CALL ACCEPT ACK' but this is merely an embodiment and the type of the MONP message is not limited to the above-described examples.

Figure 17:
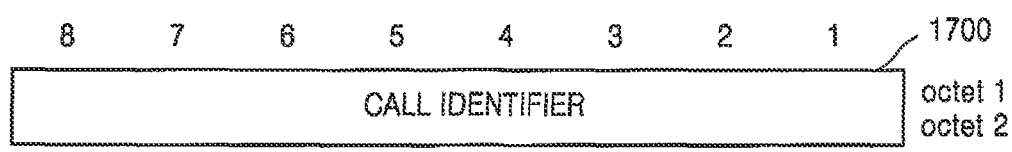
FIG. 17 is a diagram for explaining a call identifier IE of a MONP message, according to an embodiment.

FIG. 17 is a diagram for explaining a call identifier IE 1700 of a MONP message, according to an embodiment.

According to an embodiment, a call may be uniquely identified through the call identifier IE 1700 in the MONP message. The call identifier IE 1700 may be a type 3 IE with a length of 2 octets.

Figure 18:
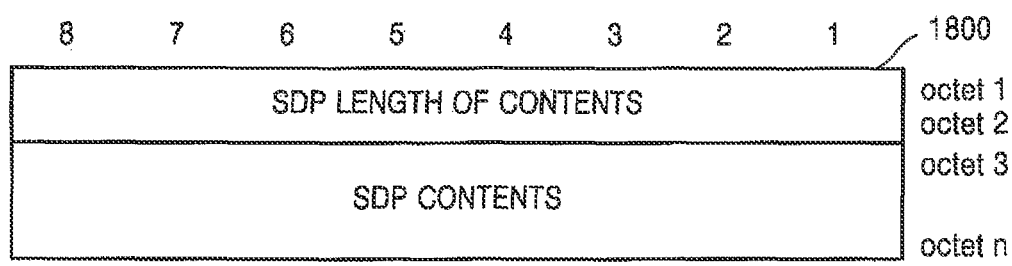
FIG. 18 is a diagram for explaining a SDP IE of a MONP message, according to an embodiment.

FIG. 18 is a diagram for explaining a SDP IE 1800 of a MONP message, according to an embodiment.

According to an embodiment, the SDP IE 1800 of the MONP message may include SDP contents (or a SDP message). The SDP IE 1800 may include SDP contents of octet 3 to octet n, where n may be a max value of 65535 octets. The SDP IE 1800 may be a type 4 IE.

FIG. 19 is a diagram for explaining a commencement mode IE 1900 of a MONP message, according to an embodiment.

According to an embodiment, the commencement mode IE 1900 of the MONP message may identify a type of a commencement mode of a private call. The commence mode may include an automatic commencement mode and a manual commencement mode. The commencement mode IE 1900 may be a type 5 IE.

Figure 20:
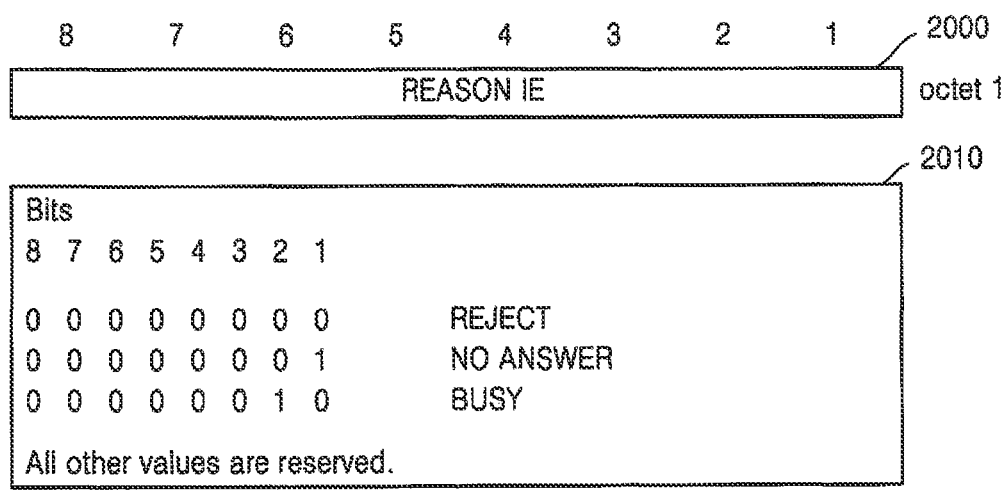
FIG. 20 is a diagram for explaining a reason IE of a MONP message, according to an embodiment.

FIG. 20 is a diagram for explaining a reason IE 2000 of a MONP message, according to an embodiment.

According to an embodiment, the reason IE 2000 of the MONP message may indicate a reason of a call rejection. The reason IE 2000 may include 'REJECT', 'NO ANSWER', 'BUSY', etc. The reason IE 2000 may be a type 6 IE.

Figure 21:
FIG. 21 is a diagram for explaining a confirm mode indication of a MONP message, according to an embodiment.

FIG. 21 is a diagram for explaining a confirm mode indication 2100 of a MONP message, according to an embodiment.

According to an embodiment, the confirm mode indication 2100 of the MONP message may indicate that a terminating terminal is expected to confirm call acceptance. The confirm mode indication 2100 may be a type 7 IE.

Figure 22:
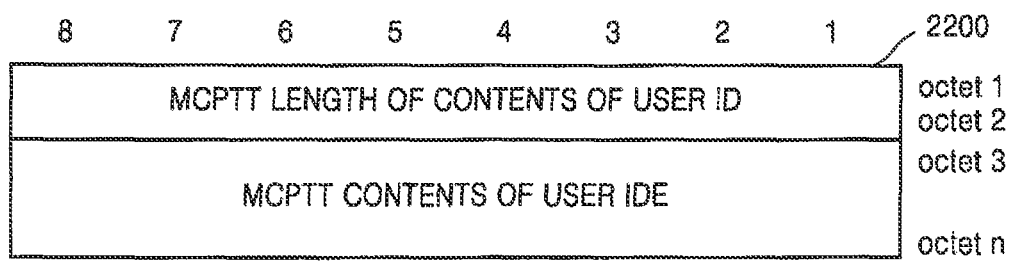
FIG. 22 is a diagram for explaining a Mission Critical Push To Talk (MCPTT) user ID IE of a MONP message, according to an embodiment.

FIG. 22 is a diagram for explaining a MCPTT user ID IE 2200 of a MONP message, according to an embodiment.

According to an embodiment, the MCPTT user ID IE 2200 of the MONP message may be used to indicate an MCPTT user ID. The MCPTT user ID 2200 may be a type 8 IE.

Figure 23:
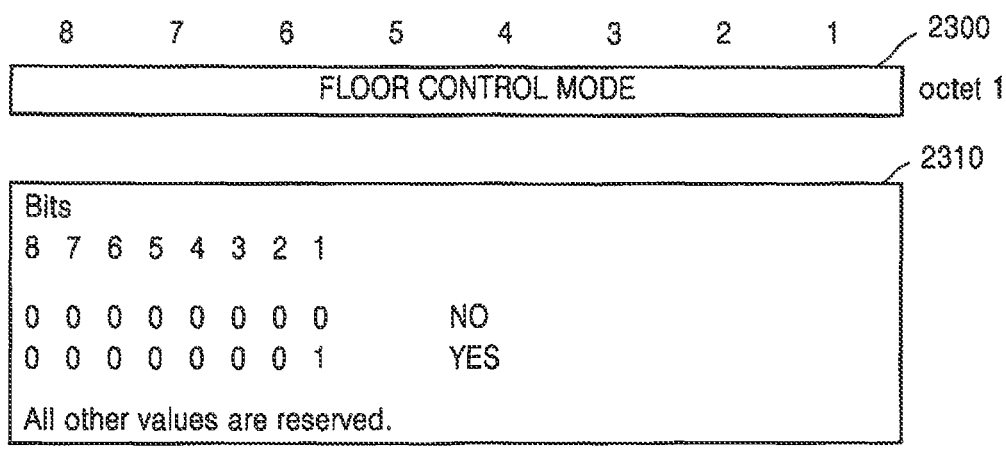
FIG. 23 is a diagram for explaining a floor control mode IE of a MONP message, according to an embodiment.

FIG. 23 is a diagram for explaining a floor control mode IE 2300 of a MONP message, according to an embodiment.

According to an embodiment, the floor control mode IE 2300 of the MONP message may indicate whether to use floor control or not. The floor control mode IE 2300 may be a type 9 IE. Contents 2310 of the floor control mode IE 2300 may be set to 'NO' or 'YES'.

Figure 24:
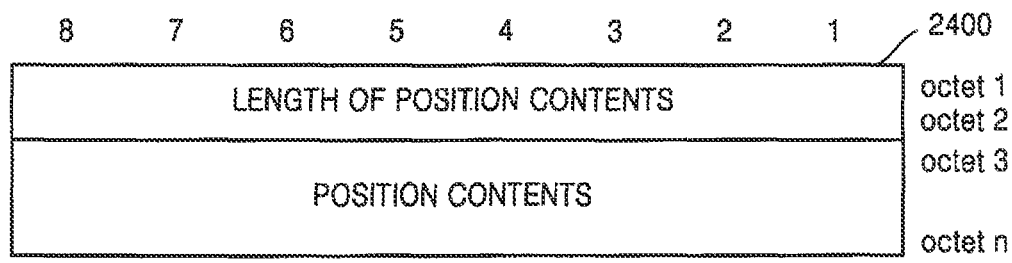
FIG. 24 is a diagram for explaining a location IE of a MONP message, according to an embodiment.

FIG. 24 is a diagram for explaining a location IE 2400 of a MONP message, according to an embodiment.

According to an embodiment, the location IE 2400 of the MONP message may indicate a location of a caller terminal. The location IE 2400 may be a type 10.

FIG. 25 is a diagram for explaining a call type IE 2500 of a MONP message, according to an embodiment.

According to an embodiment, the call type IE 2500 of the MONP message may provide information about a call type. Contents 2500 of the call type IE 2500 may be 'PRIVATE CALL' or 'EMERGENCY PRIVATE CALL'. Also, the call type IE 2500 may be a type 11 IE with a length of 1 octet.

Figure 26:
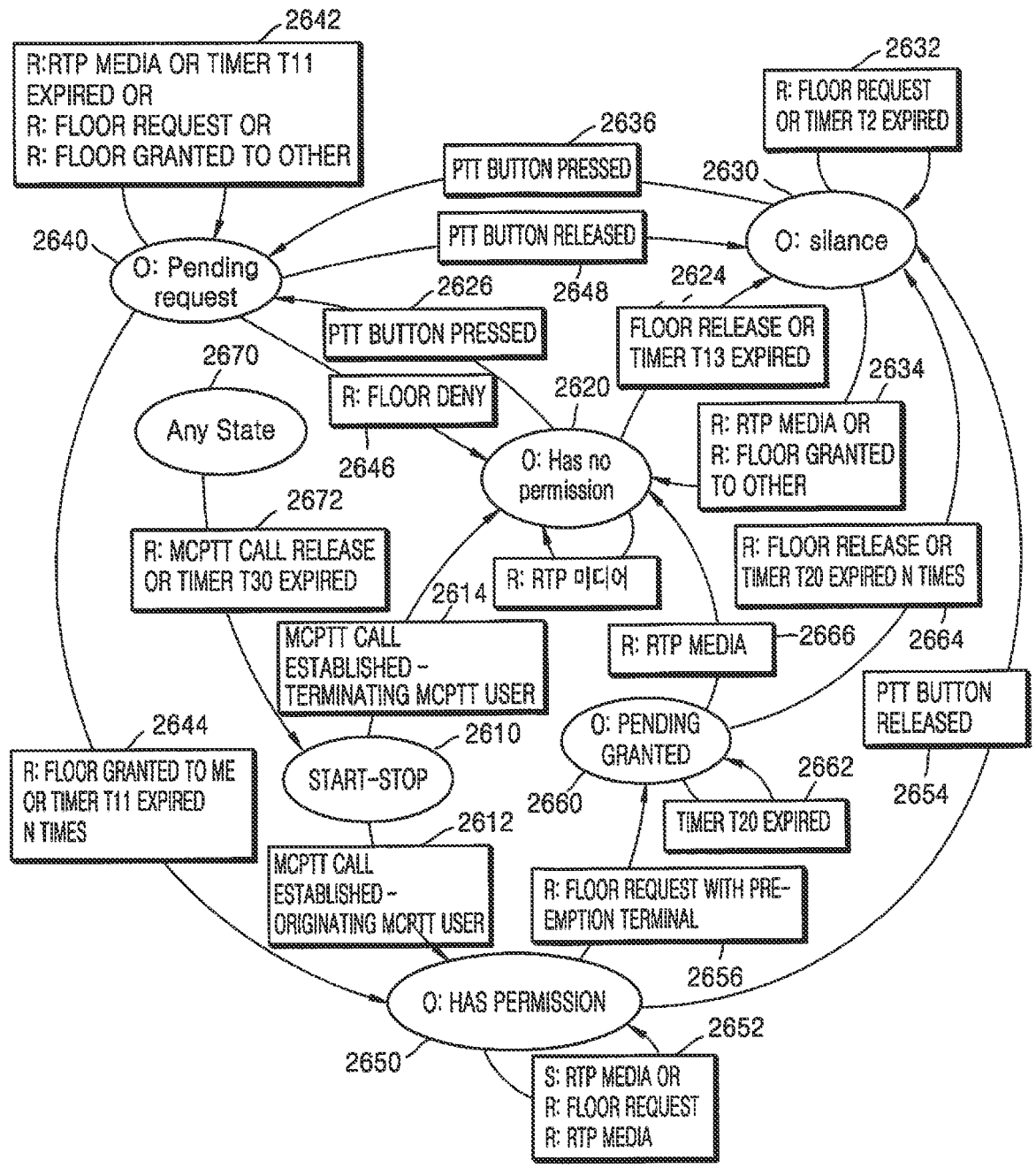
FIG. 26 is a state diagram for explaining a method performed by a terminal of controlling a floor, according to a first embodiment.

FIG. 26 is a state diagram for explaining a method performed by the terminal 100 of controlling a floor, according to a first embodiment.

According to an embodiment, a user of the terminal 100 may request to talk by pressing a PTT (push to talk) button or end talk by releasing the PTT button.

When an RTP media packet or a floor control message arrives in a state where there is no specific procedure specified for the RTP media packet or the received floor control message, the terminal 100 may discard the floor control message or the RTP media packet and may remain in a current state.

Referring to FIG. 26, when a new instance of state machine is created, before any floor control related input is applied, the state machine may be in a 'Start-stop' state 2610. Similarly when a call is released, the state machine may return to the 'Start-Stop' state 2610.

In the 'Start-Stop' state 2610, when a user of the terminal 100 is a caller, and a MCPTT group call is established 2612, the terminal 100:
1) may create an instance of a floor participant state transition diagram for basic operation state machine.
2) may enter an 'O: has permission' state 2650 in the 'Start-Stop' state 2610.

In the 'Start-Stop' state 2610, when the user of the terminal 100 is a terminating floor participant, and a MCPTT private call is established 2614, the terminal 100:
1) may create an instance of a floor participant state transition diagram for the basic operation state machine.
2) may start a timer T30 relating to during silence.
3) may start a timer T13 relating to no RTP media received.
4) may enter an 'O: has no permission' state 2620.

According to an embodiment, in an 'O: silence' state 2630, no terminal may act as a floor control server.

In the 'O: silence' state 2630, when an indication to send media is received since the user of the terminal 100 presses a PTT button 2636, the terminal 100:
1) may send the floor request message to the one or more terminals 10 and 20.
2) may start a timer T11 relating to request re-send.
3) may enter an 'O: pending request' state 2640.

In the 'O: silence' state 2630, when the terminal 100 receives RTP media packets 2634, the terminal 100:
1) may provide a floor taken notification to the user. In this regard, the floor taken notification indicates receipt of talk of another floor taken terminal.
2) may restart the timer T30 (When there is no timer T30 that is running, the terminal 100 may start the timer T30).
3) may start timer the T13.
4) may stop the tinier T20 relating to granted re-send when the timer T20 is running.
5) may start rendering the received RTP media packets.
6) may enter the 'O: has no permission' state 2620.

In the 'O: silence' state 2630, when the terminal 100 receives a floor granted message and a user ID in the floor granted message does not match its own user ID 2634, the terminal 100:
1) may provide the floor taken notification to the user.
2) may stop the timer T20 when the timer T20 is running.
3) may start the timer T13.
4) may enter the 'O: has no permission' state 2620.

In the 'O: silence' state 2630, when the terminal 100 receives the floor request message and the timer T20 is not running 2632, the terminal 100:
1) may send the floor granted message toward another terminal
2) may start the timer T20.
3) may remain in the 'O: silence' state 2630.

In the 'O: silence' state 2630, when the timer T20 expires 2632, the terminal 100:
1) may send again the floor granted message toward a floor participant that is the other terminal.
2) may restart the timer T20.
3) may remain in the 'O: silence' state 2630.

According to an embodiment, in the 'O: has no permission' 2620, when a terminal does not have permission to send media.

In the 'O: has no permission' 2620, when the terminal 100 receives an indication from the user that the user wants to send media by pressing the PTT button 2626, the terminal 100:
1) may send the floor request message to another terminal.
2) may start the timer T11 relating to request re-send.
3) may enter the 'O: pending request' state 2640.

In the 'O: has no permission' 2620, when a floor release message is received and an SSRC in the floor release message matches an SSRC in the last RTP media packet received 2624, the terminal 100:
1) may stop rendering the received RTP media packets.
2) may stop the timer T13.
3) may enter the 'O: silence' state 2630.
4) may provide floor idle notification to the user.

In the 'O: has no permission' 2620, when the timer T13 expires 2624, the terminal 100:
1) may stop rendering the received RTP media packets.
2) may enter the 'O: silence' state 2630.
3) may provide the floor idle notification to the user.

In the 'O: has no permission' 2620, when RTP media packets are received 2622, the terminal 100:
1) may render the received RTP media packets.
2) may restart the timer T30.
3) may restart the timer T13.
4) may remain in the 'O: has no permission' state 2620.

According to an embodiment, in the 'O: has permission' state 2650, the terminal 100 may act as a floor control server and has permission to send media.

In the 'O: has permission' state 2650, when encoded media is received from the user or when encoded media is already buffered 2652, the terminal 100:
1) may send a request to start sending RTP media packets towards other terminals.
2) may remain in the 'O: has permission' state 2650.

In the 'O: has permission' state 2650, when the floor request message is received and a priority level of the message is not higher, the terminal 100:
1) may send a floor deny message including a reason field toward the other terminals.
2) may remain in the 'O: has permission' state 2650.

In the 'O: has permission' state 2650, when the floor request message is received with a pre-emption priority higher than priority of the other terminal 2656, the terminal 100:
1) may stop sending RTP media packets towards other terminals.
2) may send the floor granted message.
3) may start the timer T20 relating to granted re-send.
4) may start the timer T30 relating to during silence.
5) may enter an 'O: pending granted' state 2660.

In the 'O: has permission' state 2650, when an indication is received from the user to release permission to send RTP media, the terminal 100:
1) may send the floor release message towards terminals of other floor participants.
2) may start the timer T30.
3) may enter the 'O: silence' state 2630.

According to an embodiment, in the 'O: pending request' state 2640, the terminal may waft for a response to the floor request message. In the 'O: pending request' state 2640, the timer T11 (request re-send) is running, and, to resolve race condition between multiple simultaneous floor requests, the terminal 100 may reset a counter associated with the timer T11 when another floor request with higher priority or higher SSRC, in case the priority is same, is received.

In the 'O: pending request' state 2640, when RTP media packets are received 2642, the terminal 100:
1) may render the RTP media packets.
2) may reset the counter associated with T11.
3) may restart the timer T30.
4) may restart or start, if not running already, the timer T13.
5) may remain in the 'O: pending request' state 2640.

In the 'O: pending request' state 2640, when the floor deny message is received 2646, the terminal 100:
1) may stop the timer T11 when a user ID in the floor deny message matches its own user ID.
2) may enter the 'O: has no permission' state 2620.

In the 'O: pending request' state 2640, when an indication from the user to release a pending request for the floor is received 2648 since the PTT button is released, the terminal 100:
1) may send a floor release message towards another terminal,
2) may stop the timer T11.
3) may enter the 'O: silence' state 2630.

In the 'O: pending request' state 2640, when the timer T11 expires 2642, the terminal 100:
  1) may send the floor request message to another terminal.
  2) may restart the timer T11.
  3) may remain in the 'O: pending request' state 2640.

In the 'O: pending request' state 2640, the $N^{th}$ expiring of the timer T11 2644, the terminal 100:
  1) may send the floor granted message toward the other terminal.
  2) may stop the timer T13.
  3) may stop the timer T30.
  4) may enter the 'O: has permission' state 2650.

In the 'O: pending request' state 2640, when the floor granted message is received and the user ID in the floor granted message matches its own user ID 2644, the terminal 100:
  1) may stop the timer T13 when the timer T13 is running and stop rendering received RTP media packets.
  2) may stop the timer T11.
  3) may stop the timer T30.
  4) may enter the 'O: has permission' state 2650.

In the 'O: pending request' state 2640, when the floor granted message is received and the user ID in the floor granted message does not match its own user ID (when the floor is granted to other terminals) 2644, the terminal 100:
  1) may stop rendering received RTP media packets.
  2) may reset the counter associated with T11.
  3) may re-start the timer T11.
  4) may remain in the 'O: pending request' state 2640.

In the 'O: pending request' state 2640, when the floor request message is received and the priority of received request is higher or the SSRC of the received request is higher or the priority is the same 2642, the terminal 100:
  1) may reset the counter associated with T11.
  2) may re-start the timer T11.
  3) may remain in the 'O: pending request' state 2640.

According to an embodiment, in the 'O: pending granted' state 2660, the terminal 100 may be waiting for another terminal to take over the role of a floor controller. In the 'O: pending granted' state 2660, the timer T20 (granted re-send) may be running.

In the 'O: pending granted' state 2660, when the RTP media packets are received, the terminal 100:
  1) may render the received RTP media packets.
  2) may stop the timer T20 when the timer T20 is running.
  3) may restart the timer T30.
  4) may start the timer T13.
  5) may enter the 'O: has no permission' state 2620.

In the 'O: pending granted' state 2660, when the timer T20 expires 2662, the terminal 100:
  1) may send again the floor granted message toward terminals of other floor participants.
  2) may restart the timer T20.
  3) may remain in the 'O: pending granted' state 2660.

In the 'O: pending granted' state 2660, on the $N^{th}$ expiring of the timer T20 2662, the terminal 100 may enter the 'O: silence' state 2630.

In the 'O: pending granted' state 2660, when the floor release message is received 2664, the terminal 100 may enter the 'O: silence' state 2630.

According to an embodiment, an 'Any' state 2670 may be applied to all states except for the 'Start-stop' state 2610. In all states except for the 'Start-stop' state 2610, when a MCPTT call release is received from an application, the MCPTT call is going to be released or the timer T30 expires, the terminal 100:
  1) may stop sending floor control messages towards a terminal of another participant.
  2) may stop sending and receiving RTP media packets.
  3) may release all resources including any running timers associated with the MCPTT call.
  4) may terminate the instance of floor participant state transition diagram.
  5) may enter the 'Start-stop' state 2610.

Figure 27:
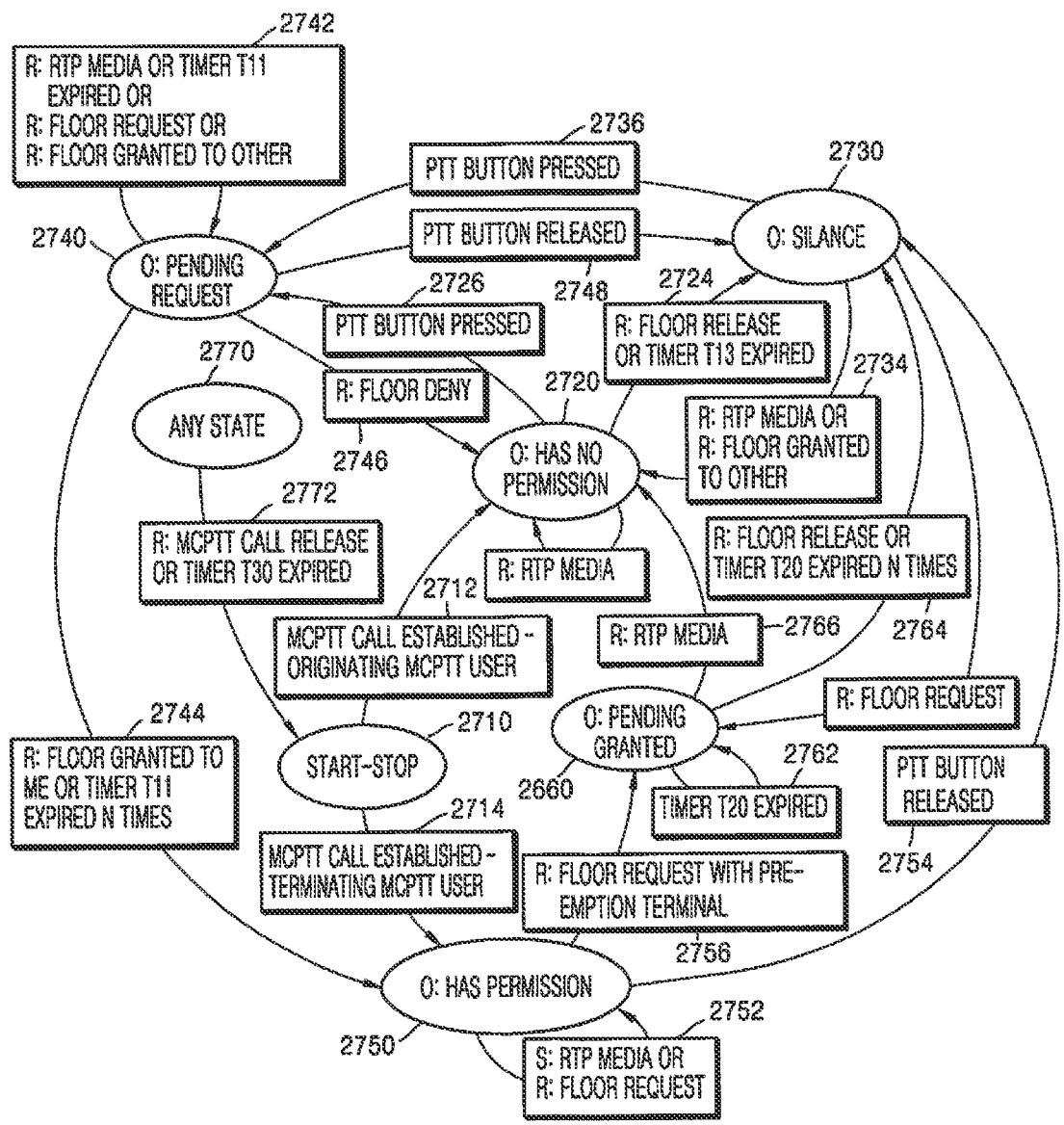
FIG. 27 is a state diagram for explaining a method performed by a terminal of controlling a floor, according to a second embodiment.

FIG. 27 is a state diagram for explaining a method performed by the terminal 100 of controlling a floor, according to a second embodiment.

In FIG. 27, a "Start-stop" state 2710, an "O: has no permission" state 2720, an "O: pending request" state 2740, an "O: has permission" state 2750, an "O: pending granted" state 2760, and an "Any" state 2770 may respectively correspond to the "Start-stop" state 2610, the "O: has no permission" state 2620, the "O: pending request" state 2640, the "O: has permission" state 2650, the "O: pending granted" state 2660, and the "Any" state 2670 described with reference to FIG. 26 above.

According to an embodiment, in an 'O: silence' state 2730, no terminal may act as a floor local control server.

In the 'O: silence' state 2730, when an indication to send media is received since the user of the terminal 100 presses a PTT button 2736, the terminal 100:
  1) may send a floor request message to the one or more terminals 10 and 20.
  2) may start the timer T11 relating to request re-send.
  3) may enter the 'O: pending request' state 2740.

In the 'O: silence' state 2730, when the terminal 100 receives RTP media packets 2734, the terminal 100:
  1) may provide a floor taken notification to the user.
  2) may restart the timer T30 (When there is no timer T30 that is running, the terminal 100 may start the timer T30).
  3) may start timer the T13.
  4) may stop the timer T20 relating to granted re-send when the timer T20 is running.
  5) may start rendering the received RTP media packets.
  6) may enter the 'O: has no permission' state 2720.

In the 'O: silence' state 2730, when the terminal 100 receives a floor granted message and a user D in the floor granted message does not match its own user ID 2734, the terminal 100:
  1) may provide the floor taken notification to the user.
  2) may stop the timer T20 when the timer T20 is running.
  3) may start the timer T13.
  4) may enter the O: has no permission' state 2720.

In the 'O: silence' state 2730, when the terminal 100 receives the floor request message and the timer T20 is not running 2732, the terminal 100:
  1) may send the floor granted message toward another terminal.
  2) may start the timer T20.
  3) may enter the 'O: has no permission' state 2720.

Figure 28:
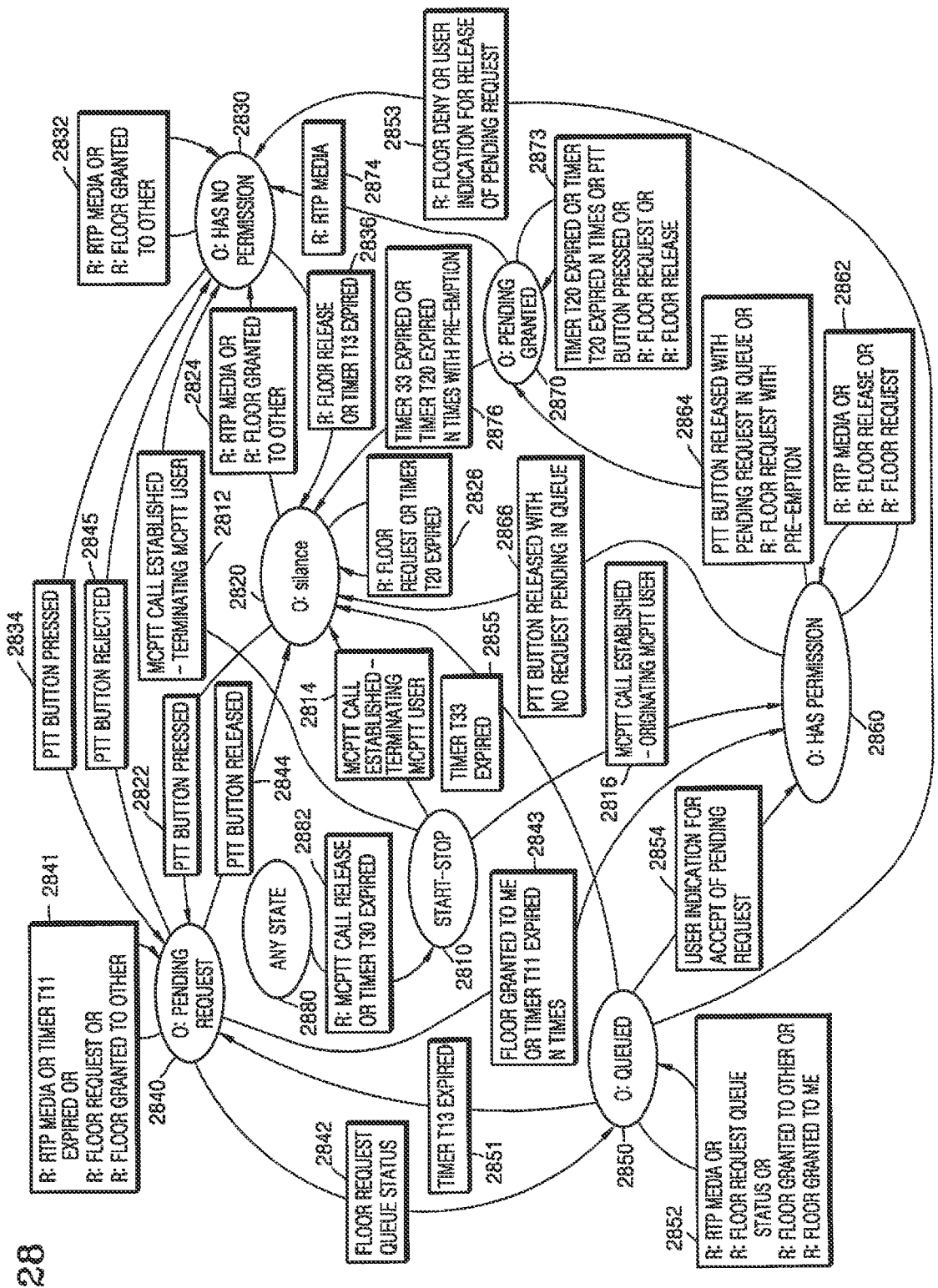
FIG. 28 is a state diagram for explaining a method performed by a terminal of controlling a floor, according to a third embodiment.

FIG. 28 is a state diagram for explaining a method performed by the terminal 100 of controlling a floor, according to a third embodiment.

According to an embodiment, a user of the terminal 100 may request to talk by pressing a PTT (push to talk) button or end talk by releasing the PTT button.

When an RTP media packet or a floor control message arrives in a state where there is no specific procedure specified for the RTP media packet or the received floor control message, the terminal 100 may discard the floor control message or the RTP media packet and may remain in a current state.

Referring to FIG. 28, when a new instance of state machine is created, before any floor control related input is applied, the state machine may be in a 'Start-stop' state 2810. Similarly when a call is released, the state machine may return to the 'Start-Stop' state 2810.

In the 'Start-Stop' state 2810, when a user of the terminal 100 is a caller, and a MCPTT group call is established 2816, the terminal 100:
1) may create an instance of a floor participant state transition diagram for basic operation state machine.
2) may send a floor granted message towards terminals of other floor participants. In this regard, the own user ID of the terminal 100 may be indicated in the floor granted message.
3) may start the timer T30.
4) may enter an 'O: has permission' state 2860.

In the 'Start-Stop' state 2810, when the user of the terminal 100 is a terminating floor participant, and a MCPTT group call is established 2814, the terminal 100:
1) may create an instance of a floor participant state transition diagram for the basic operation state machine.
2) may start the timer 130.
3) may enter an 'O: silence' state 2820.

In the 'Start-Stop' state 2810, when the user of the terminal 100 is the terminating floor participant, and a MCPTT private call is established 2812, the terminal 100:
1) may create an instance of a floor participant state transition diagram for the basic operation state machine.
2) may start the timer T30.
3) may start the timer T13.
4) may enter an 'O: has no permission' state 2830.

According to an embodiment, in an 'O: silence' state 2820, no terminal may act as a floor local control server.

In the 'O: silence' state 2820, when an indication to send media is received since the user of the terminal 100 presses a PTT button 2822, the terminal 100:
1) may send the floor request message to terminals of other floor participants.
2) may start the timer T11.
3) may enter an 'O: pending request' state 2840.

In the 'O: silence' state 2820, when the terminal 100 receives RTP media packets 2824, the terminal 100:
1) may provide a floor taken notification to the user.
2) may restart the timer T30.
3) may start timer the T13. When there is no timer T13 that is already running, the terminal 100 may start the timer T13.
4) may stop the timer T20 when the timer T20 is running.
5) may start rendering the received RTP media packets.
6) may enter the 'O: has no permission' state 2830.

In the 'O: silence' state 2820, when the terminal 100 receives a floor granted message and a user ID in the floor granted message does not match its own user ID (when the floor is granted to another terminal) 2824, the terminal 100:
1) may provide the floor taken notification to the user.
2) may start the timer T13.
3) may enter the 'O: has no permission' state 2830.

In the 'O: silence' state 2820, when the terminal 100 receives the floor request message and the timer T20 is not running 2826, the terminal 100:
1) may send the floor granted message toward the terminal of another floor participant.
2) may start the timer T20.
3) may remain in the 'O: silence' state 2820.

In the 'O: silence' state 2820, when the timer T20 expires 2826, the terminal 100:
1) may send again the floor granted message toward the terminal of another floor participant.
2) may restart the timer T20.
3) may remain in the 'O: silence' state 2820.

According to an embodiment, in the 'O: has no permission' 2830, when a terminal does not have permission to send media.

In the 'O: has no permission' state 2830, when the terminal 100 receives an indication from the user that the user wants to send media by pressing the PTT button 2834, the terminal 100:
1) may send the floor request message to another terminal.
2) may start the timer T11.
3) may enter an 'O: pending request' state 2840.

In the 'O: has no permission' 2830, when a floor release message is received and an SSRC in the floor release message matches an SSRC in the last RTP media packet received 2826, the terminal 100:
1) may stop rendering the received RTP media packets.
2) may stop the timer T13.
3) may enter the 'O: silence' state 2820.
4) may provide floor idle notification to the user.

In the 'O: has no permission' state 2830, when the timer T13 expires 2836 the terminal 100:
1) may stop rendering the received RTP media packets.
2) may enter the 'O: silence' state 2820.
3) may provide the floor idle notification to the user.

In the 'O: has no permission' state 2830, when the floor granted message is received and the user ID in the floor granted message does not match its own user ID (when the floor is granted to other terminals) 2832, the terminal 100 may remain in the 'O: has no permission' state 2830.

In the 'O: has no permission' 2830, when RTP media packets are received 2832, the terminal 100:
1) may render the received RTP media packets.
2) may restart the timer T30.
3) may restart the timer T13.
4) may remain in the 'O: has no permission' state 2830.

According to an embodiment, in an 'O: has permission' state 2860, the terminal 100 may act as a floor control server and has permission to send media.

In the 'O: has permission' state 2860, when encoded media is received from the user or when encoded media is already buffered 2862, the terminal 100:
1) may send RTP media packets towards other terminals.
2) may remain in the 'O: has permission' state 2860.

In the 'O: has permission' state 2860, when a floor release message is received 2862, the terminal 100:
1) may remove a sender of the floor release message from a queue when a user ID in the floor release message matches a queued request of user ID.
2) may remain in the 'O: has permission' state 2860.

In the 'O: has permission' state 2860, when a floor request message is received in a queuing mode 2862 and a priority level of the message is not higher, the terminal 100:
1) may store the received floor request message.
2) may send a floor queue position Info message. In this regard, the floor queue position Info message may indicate the user ID of the terminal 100 in the floor request queue, the SSRC of the terminal 100 in the floor request queue, indicate a position of the terminal 100 in the floor request queue, and indicate the priority level of the terminal 100 in the in the floor request queue.
3) may remain in the 'O: has permission' state 2860.

In the 'O: has permission' state 2860, when an indication is received from the user to release permission to send RTP media 2864 (the PTT button is released by the user), the terminal 100:
1) may send the floor release message towards terminals of other floor participants when no queued requests exist.
2) may start the timer T30.
3) may enter the 'O: silence' state 2820.

In the 'O: has permission' state 2860, when no more encoded media is received from the user and at least one floor request message is stored 2864 (it is assumed that a queuing mode is used), the terminal 100:
1) may stop sending RTP media packets towards the other terminals 100.
2) may send the floor granted message toward the terminals of the other floor participants. The floor granted message may indicate user IDs of the terminals 100 in the floor request queue, include SSRCs of the floor participants in the floor request queue, include positions of the floor participants in the floor request queue, and include priority levels of the floor participants in the floor request queue.
3) may start the timer T20.
4) may start the timer T30.
5) may enter an 'O: pending granted' state 2870.

In the 'O: has permission' state 2860, when the floor request message is received with a pre-emption priority higher than priority of the floor participant 2864, the terminal 100:
1) may stop sending RTP media packets towards the other terminals 100.
2) may send the floor granted message. The floor granted message may include the user IDs of the floor participants in the floor request queue, include the SSRCs of the floor participants in the floor request queue, include queue positions of the floor participants in the floor request queue, and include the priority levels of the floor participants in the in the floor request queue.
3) may start the timer T20. The timer T20 may indicate user IDs of the terminals 100 in the floor request queue.
4) may start the timer T30.
5) may enter the 'O: pending granted' state 2870.

According to an embodiment, in the 'O: pending request' state 2840, the terminal 100 may be waiting for a response to the floor request message. In the 'O: pending request' state 2840, the timer T11 is running, and, to resolve race condition between multiple simultaneous floor requests, the terminal 100 may reset a counter associated with T11 when another floor request with higher priority or higher SSRC, in case the priority is same, is received.

In the 'O: pending request' state 2840, when RTP media packets is received, the terminal 100:
1) may render the RTP media packets,
2) may reset the counter associated with T11.
3) may restart the timer T30.
4) may restart or start, if not running already, the timer T13.
5) may remain in the 'O: pending request' state 2840.

In the 'O: pending request' state 2840, when a floor request queue status message is received, the terminal 100:
1) may update the queue status when a user ID in the floor request queue status message matches its own user ID.
2) may notify the user about information about the queue position.
3) may stop the timer T11.
4) may enter an 'O: queued' state 2850.

In the 'O: pending request' state 2840, when a floor deny message is received 2945, the terminal 100:
1) may stop the timer T11 when a user ID in the floor deny message matches its own user ID.
2) may enter the 'O: has no permission' state 2830.

In the 'O: pending request' state 2840, when an indication is received from the user to release a pending request for the floor 2844 since the PTT button is released, the terminal 100:
1) may send a floor release message towards terminals of other floor participants.
2) may stop the timer T11.
3) may enter the 'O: silence' state 2820.

In the 'O: pending request' state 2840, on the $N^{th}$ firing of the tinier 2843, the terminal 100:
1) may send the floor granted message toward the terminals of the other floor participants. The floor granted message may indicate the user ID of the terminal 100.
2) may stop the timer T13.
3) may stop the timer T30.
4) may enter the 'O: has permission' state 2860.

In the 'O: pending request' state 2840, when the floor granted message is received and the user ID in the floor granted message matches its own user ID 2843, the terminal 100:
1) may stop rendering received RTP media packets.
2) may stop the timer T13 when the timer T13 is running.
3) may stop the timer T30 when the timer T30 is running.
4) may enter the 'O: has permission' state 2860.

In the 'O: pending request' state 2840, when the floor granted message is received and the user ID in the floor granted message does not matches its own user ID 2841 (the floor is granted to another terminal), the terminal 100:
1) may stop rendering received RTP media packets.
2) may reset a counter associated with the timer T11.
3) may re-start the timer T11.
4) may remain in the 'O: pending request' state 2840.

In the 'O: pending request' state 2840, when the timer T11 expires 2841, the terminal 100:
1) may send the floor request message to terminals of other floor participants
2) may restart the timer T11.
3) may remain in the 'O: pending request' state 2840.

In the 'O: pending request' state 2840, when the floor request message is received and the priority of received request is higher or the SSRC of received request is higher and the priority is same 2841, the terminal 100:
1) may reset the counter associated with the timer T11.
2) may re-start the timer T11.
3) may remain in the 'O: pending request' state 2840.

According to an embodiment, in an 'O: pending granted' state 2870, the terminal 100 may be waiting for another terminal to take over the role of a floor controller. In the 'O: pending granted' state 2870, the timer T20 may be running.

In the 'O: pending granted' state 2870, when the RTP media packets are received 2874, the terminal 100:
1) may render the received RTP media packets.
2) may stop the timer T20 when the timer T20 is running.
3) may stop a timer T33 relating to a pending user action when the timer T33 is running.
4) may restart the timer T30.
5) may start the timer T13.
6) may enter the 'O: has no permission' state 2830.

In the 'O: pending granted' state 2870, when the timer T20 expires 2873, the terminal 100:
1) may send again the floor granted message toward terminals of other floor participants. The floor granted message may include user IDs of the terminals 100 in the floor request queue, SSRCs of the floor participants in the floor request queue, positions of the floor participants in the floor request queue, and priority levels of the floor participants in the in the floor request queue.

3) may restart the timer 120.

4) may remain in the 'O: pending granted' state 2870.

In the 'O: pending granted' state 2870, when the timer T20 expires N times with a request pending in the queue 2873, the terminal 100:

1) may reset the count of N.
2) may start the timer T33.
3) may remain in the 'O: pending granted' state 2870.

In the 'O: pending granted' state 2870, when the timer 133 expires 2876, the terminal 100:

1) may send the floor release message towards other floor participants.
2) may enter the 'O: silence' state 2820.

In the 'O: pending granted' state 2870, when the user sends an indication to send media by pressing the PTT button 2873, the terminal 100:

1) may notify the about rejection.
2) may remain in the 'O: pending granted' state 2870.

In the 'O: pending granted' state 2870, when the floor release message is received 2873, the terminal 100:

1) may remove a sender of the floor release message from the queue when the user ID in the floor release message matches a user ID of the queued request.
2) may remain in the 'O: pending granted' state 2870.

In the 'O: pending granted' state 2870, when the floor request message is received 2873, the terminal 100:

1) may send the floor deny message including the reason field toward terminals of the other floor participants.
2) may remain in the 'O: pending granted' state 2870.

In the 'O: pending granted' state 2870, when the timer T20 expires N times after receiving the floor request message with pre-emption 2876, the terminal 100:

1) may reset the count of N.
2) may enter the 'O: silence' state 2820.

According to an embodiment, in the 'O: queued' state 2850, the terminal 100 may be waiting for a response to a pending request.

In the 'O: queued' state 2850, when RTP media packets are received 2852, the terminal 100:

1) may render the RTP media packets.
2) may restart the timer T30,
3) may restart the timer T13.
4) may remain in the 'O: queued' state 2850.

In the 'O: queued' state 2850, when the floor queue position Info message is received 2852, the terminal 100:

1) may update the queue position when the user ID in the floor queue position Info message matches its own user ID.
2) may notify the about information about the queue position.
3) may remain in the 'O: queued' state 2850.

In the 'O: queued' state 2850, when the floor deny message is received 2853, the terminal 100:

1) may stop the timer T33 when the timer T33 is running.
2) may enter the 'O: has no permission' state 2830.

In the 'O: queued' state 2850, when an indication from the user to release the pending request for the floor is received 2853, the terminal 100:

1) may send the floor release message towards terminals of other floor participants.
2) may stop the timer T33 when the timer T33 is running.
3) may enter the 'O: has no permission' state 2830.

In the 'O: queued' state 2850, when the floor granted message is received 2852, the terminal 100: In this regard, when the user ID in the received floor granted message matches its own user ID, the terminal 100 may acknowledge that the floor granted message is received thereto.

1) may stop rendering received RTP media packets.
2) may start the timer T33.
3) may notify the user about of the floor grant.
4) may remain in the 'O: queued' state 2850.

In the 'O: queued' state 2850, when the timer T33 expires 2855, the terminal 100 may enter the 'O: silence' state 2820.

In the 'O: queued' state 2850, when an indication is received from the user that the user wants to send media and the timer T33 is running 2854, the terminal 100:

1) may stop the timer T33.
2) may stop the timer T30 when the timer T30 is running.
3) may enter the 'O: has permission' state 2860.

In the 'O: queued' state 2850, when the floor granted message of another terminal is received 2852, the terminal 100: In this regard, when the user ID in the floor granted message does not match its own user ID, the terminal 100 may acknowledge that the floor of another terminal is granted.

1) may stop rendering received RTP media packets.
2) may remain in the 'O: queued' state 2850.

In the 'O: queued' state 2850, when the timer T13 expires 285, the terminal 100:

1) may stop rendering the received RTP media packets.
2) may send the floor granted message toward terminals of other floor participants.
3) may start the timer T11.
4) may remain in the 'O: pending request' state 2840.

According to an embodiment, an 'Any' state 2880 may be applied to all states except for the 'Start-stop' state 2810. In the 'Any' state 2880, when a call release is received from an application, the call is going to be released or the timer T30 expires, the terminal 100:

1) may stop sending floor control messages towards a terminal of another participant.
2) may stop sending and receiving RTP media packets.
3) may release all resources including any running timers associated with the MCPTT call.
4) may terminate the instance of floor participant state transition diagram.
5) may enter the 'Start-stop' state 2810.

Figure 29:
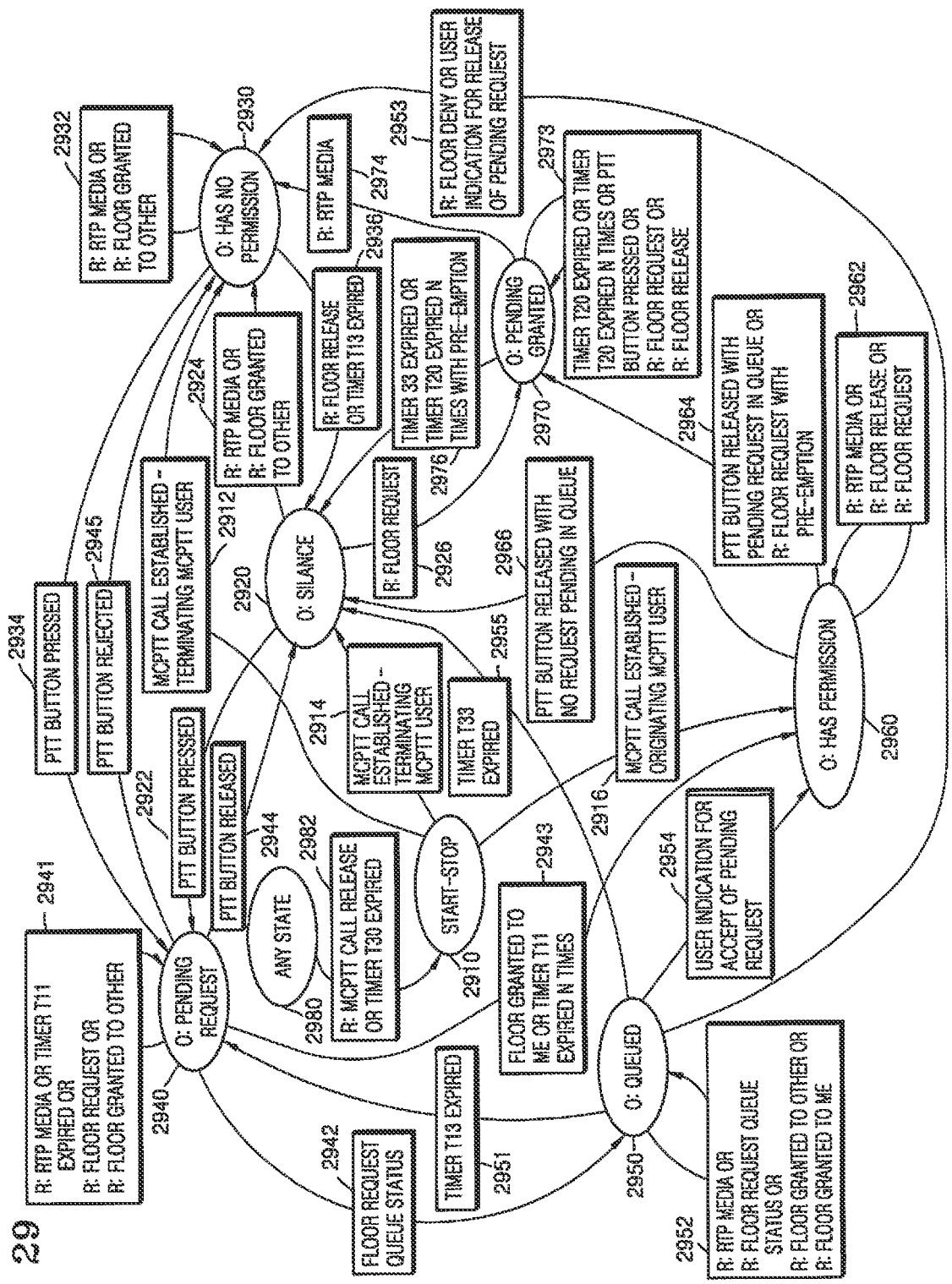
FIG. 29 is a state diagram for explaining a method performed by a terminal of controlling a floor, according to a fourth embodiment.

FIG. 29 is a state diagram for explaining a method performed by the terminal 100 of controlling floor, according to a fourth embodiment.

In FIG. 29, a "Start-stop" state 2910, an "O: has no permission" state 2930, an "O: pending request" state 2740, an "O: queued" state 2950, an "O: has permission" state 2760, an "O: pending granted" state 2970, and an "Any" state 2980 may respectively correspond to the "Start-stop" state 2810, the "O: has no permission" state 2830, the "O: pending request" state 2840, the "O: queued" state 2850, the "O: has permission" state 2860, the "O: pending granted" state 2870, and the "Any" state 2880 described with reference to FIG. 28 above.

According to an embodiment, in an 'O: silence' state 2930, no terminal may act as a floor local control server.

In the 'O: silence' state 2930, when an indication to send media is received since the user of the terminal 100 presses a PTT button 2922, the terminal 100:

1) may send a floor request message to other floor participants.
2) may start the timer T11.
3) may enter the 'O: pending request' state 2940.

In the 'O: silence' state 2920, when the terminal 100 receives RTP media packets 2924, the terminal 100:
1) may provide a floor taken notification to the user.
2) may restart the timer T30.
3) may start timer the T13. Also, when there is no timer T13 that is running, the terminal 100 may start the tinier T13.
4) may stop the timer T20 when the timer T20 is running.
5) may start rendering the received RTP media packets.
6) may enter the 'O: has no permission' state 2930.

In the 'O: silence' state 2920, when the terminal 100 receives a floor granted message and a user ID in the floor granted message does not match its own user ID 2824 (the floor is granted to another terminal), the terminal 100:
1) may provide the floor taken notification to the user.
2) may start the timer T13.
3) may enter the 'O: has no permission' state 2930.

In the 'O: silence' state 2920, when the terminal 100 in a state where a private call is established receives a floor request message 2926, the terminal 100:
1) may send a floor granted message toward the terminals of other floor participant. The floor granted message may include user IDs of the terminals 1000 in a floor request queue, SSRC of the floor participants in the floor request queue, positions of the floor participants in the floor request queue, and priority levels of the floor participants in the floor request queue.
2) may start the timer T20.
3) may enter the "O: pending granted" state 2970.

Figure 30:
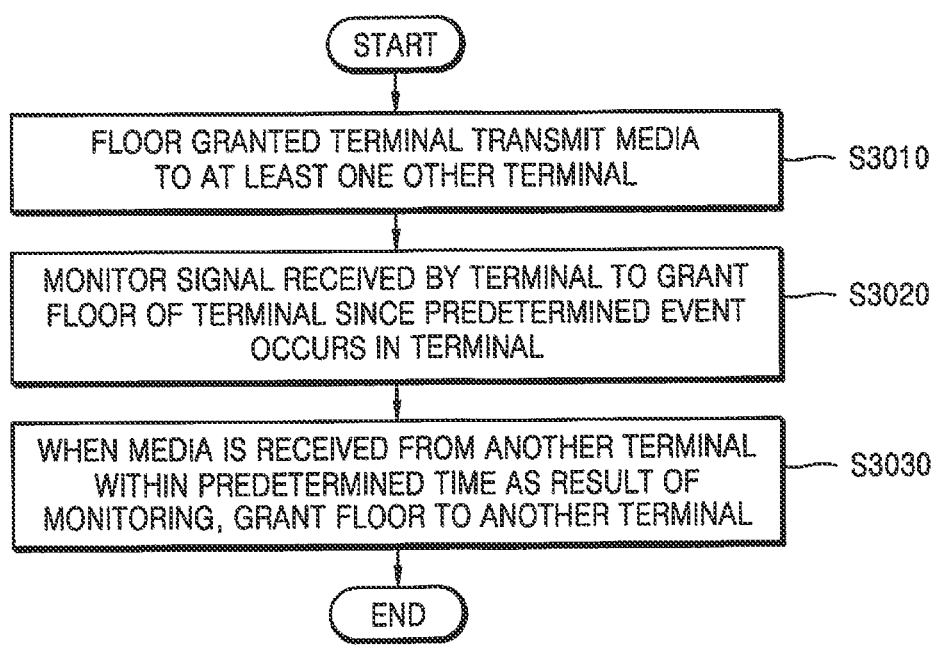
FIG. 30 is a flowchart of explaining a method performed by a terminal of controlling a floor, according to an embodiment.

FIG. 30 is a flowchart of explaining a method performed by the terminal 100 of controlling floor, according to an embodiment.

In operation S3010, the terminal 100 may transmit media to at least one other terminal. In this regard, it is assumed that the terminal 100 is a floor granted terminal in a MCPTT service.

Meanwhile, in operation S3010, the terminal 100 may be the "O: has permission" state 2860 described above with reference to FIG. 28.

In operation S3020, the terminal 100 may monitor a signal received by the terminal 100 to grant the floor of the terminal 100 since a predetermined event occurs in the terminal 100.

Meanwhile, according to an embodiment, the terminal 100 may store a queuing list including identification information of another terminal that requests the floor. When the queuing list is stored in the terminal 100, the predetermined event may include a case where media transmission of the terminal 100 ends in a state where a floor request stored in the queuing list exists.

According to another embodiment, the predetermined event may include a case where a floor request of a terminal having priority is received. The terminal 100 may monitor a signal received by the terminal 100 to grant the floor of the terminal 100 when the floor request of the terminal having priority is received.

In operation S3030, when media is received from another terminal within a predetermined time as a result of monitoring, the terminal 100 may grant the floor to another terminal.

Meanwhile, according to an embodiment, when media is not received before the expiration of a first timer indicating a predetermined pending-user action period as a result of monitoring, the terminal 100 may send a floor release message to the at least one other terminal.

Also, when the terminal 100 receives an indication to request media transmission from a user of the terminal 100 during monitoring, the terminal 100 may provide a notification to the user to reject the media transmission.

Meanwhile, when corresponding identification information exists between identification information included in the floor release message received by the terminal 100 during monitoring and identification information of the terminal 100 stored in the queuing list of the terminal 100, the corresponding identification information may be removed.

Also, according to an embodiment, the terminal 100 may transmit a floor reject message to the at least one terminal when a floor request message is received from any one of the at least one terminal during monitoring.

According to another embodiment, the terminal 100 may release the floor when a second timer indicating an authorized retransmission period after receiving the floor request message from another terminal having priority higher than the terminal 100 during monitoring. In a state where the floor is released, any one of at least one other terminal may not have the floor.

Meanwhile, in operation S3030, the terminal 100 may be in the "O: pending granted" state 2870 described above with reference to FIG. 28.

Figure 31:
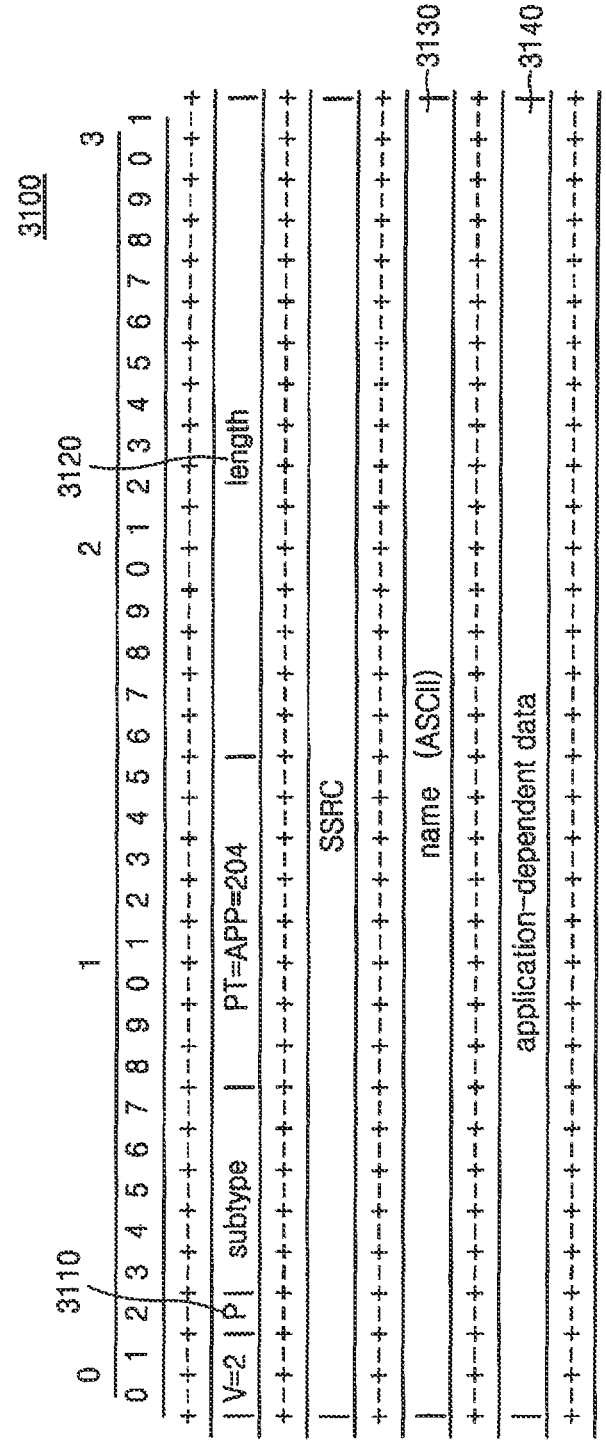
FIG. 31 is a diagram showing a floor control message according to an embodiment.

FIG. 31 is a diagram showing a floor control message 3100 according to an embodiment.

According to an embodiment, the floor control message 3100 may be based on RTCP application packets, as defined in IETF RFC 3550, but may not conform to rules for compound RTCP packets or RTCP packet transmission.

Each floor control message may be one RTCP: APP packet. These RTCP: APP packets may not be sent in compound RTCP packets, but more than one floor control message may be sent in a single IP packet.

Meanwhile, referring to FIG. 31, a padding bit field 3110 may be set to 0. Also, a length field 3120 may be a length of a packet in 32-bit words, not counting a first 32-bit word in which the length field 3120 resides. In this regard, the length field 3120 may indicate a value of message size longer than specified in this version of a protocol. For example, this may be the case when the message is of later version of this protocol.

In a name field 3130, a 4-byte ASCII string in a RTCP header may be used to define a set of floor control messages to be unique with respect to other APP packets that the application may receive.

In an application-dependent data field 3140, when a length of application dependent data is not a multiple of 4 bytes, the application dependent data may be padded to a multiple of 4 bytes by setting the value of the padding bytes to zero.

Meanwhile, the terminal 100 may ignore a whole message when a subtype of the message is unknown with respect to receipt of the floor control message 3100. Also, the terminal 100 may ignore unspecified fields in the message. Also, the terminal 100 may ignore syntactically incorrect optional fields.

FIG. 32 is a diagram for explaining floor control message fields 3210 through 3250 according to an embodiment.

Referring to FIG. 32, the floor control message field 3210 may be used in RTCP.

Also, the user ID field 3220 may include a value indicating MCPTT user identification. The user ID field 3220 may include information indicating a length of a value except padding. Also, when the length of the user ID field 3220 is not a multiple of 4 bytes except first 16-bit words, 0 may be padded to a multiple of 4 bytes as the length of the user ID field 3220.

The queue field 3230 may include a terminal waiting for a MCPTT call, i.e. additional information indicating a next talker. A queue-length field may include a value 2 indicating a length of this item.

The priority-level field 3240 may have a value 2 indicating a length of this item. The priority-level field 3240 may consist of 16 bit parameter giving a defined media burst request priority level. The defined priority levels may include normal priority, high priority, and pre-emptive priority. All other values may be reserved and may not be used.

The floor request message field 3250 may be used for other information.

Figure 33:
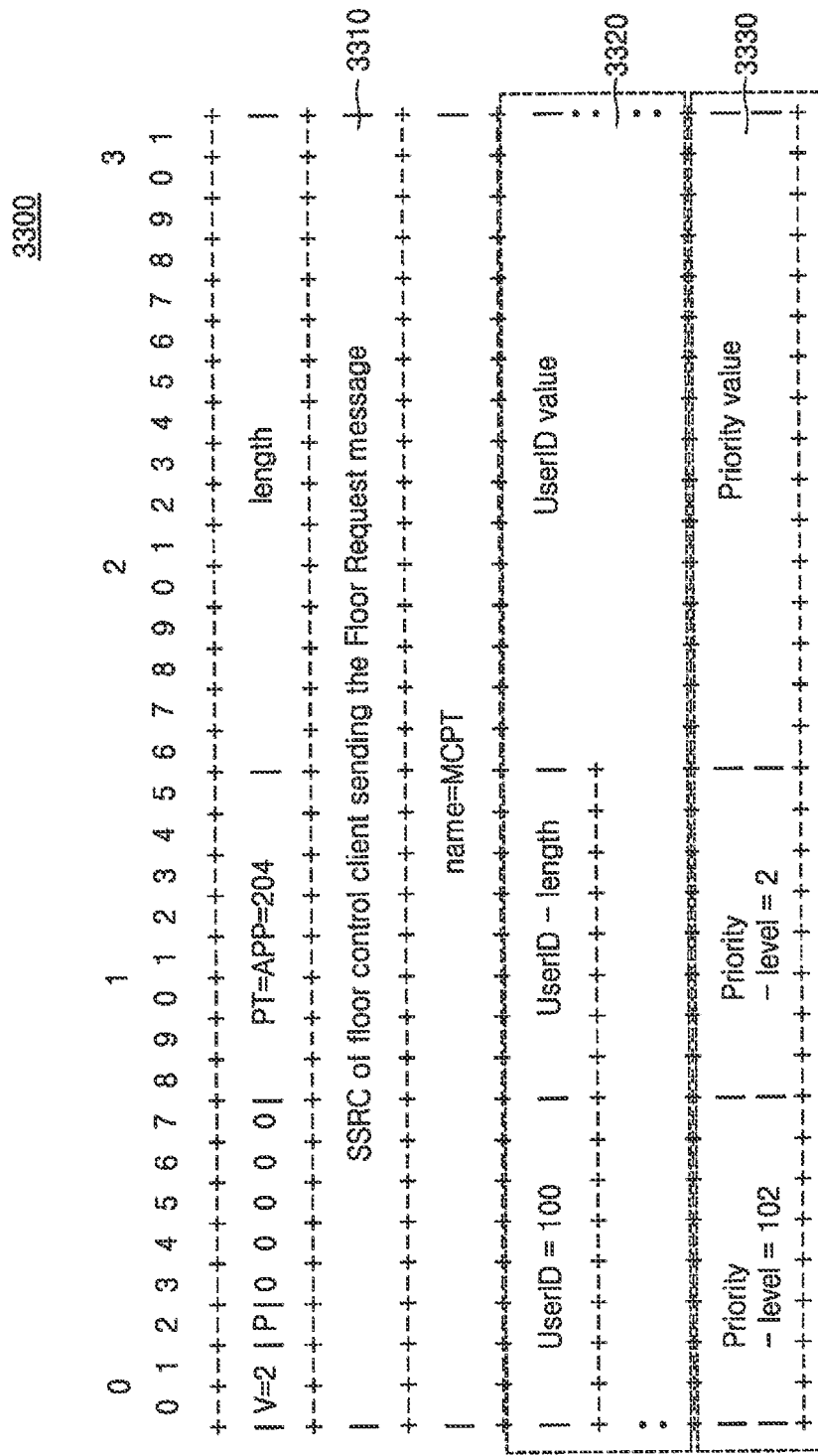
FIG. 33 is a diagram showing a floor request message according to an embodiment.

FIG. 33 is a diagram showing a floor request message 3300 according to an embodiment.

Referring to FIG. 33, an SSRC field 3310 may include a synchronization SouRCe Identifier (SSRC) of a floor control terminal. A user ID field 3320 may include a user ID of the floor control terminal. A priority level field 3330 may be included in the floor request message 3300 when between the floor control clients have agreed to support queuing of floor requests.

Figure 34:
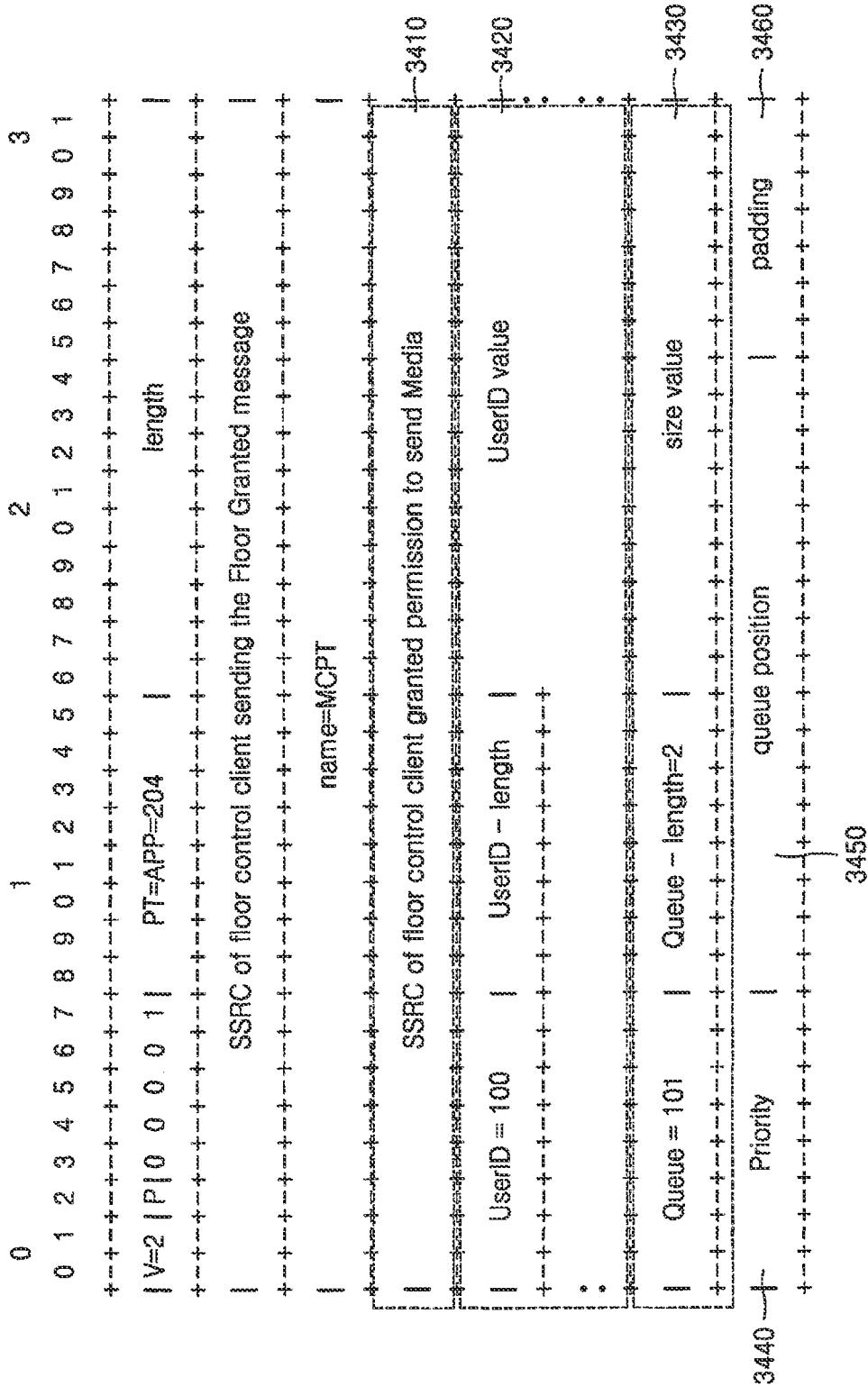
FIG. 34 is a diagram showing a floor granted message according to an embodiment.

FIG. 34 is a diagram showing a floor granted message 3400 according to an embodiment.

The floor granted message 3400 may be a message from a floor control terminal to inform a requesting floor control terminal that the floor has been granted.

A SSRC field 3410 may include a SSRC of the floor granted terminal. A user ID field 3420 may include a user ID of the floor granted terminal. A queue field 3430 may include a position of a user waiting for having the floor granted, an SSRC, a user ID, etc. A priority field 3440 may be a 1 byte field which defines a priority level that is currently held by the floor control client having the floor granted. When a priority option is not negotiated at MCPTT call setup, a default value may be 1. A queue position field 3450 may define the number of terminals in the floor request queue status message. A padding field 3460 may be set to zero.

FIG. 35 is a diagram showing a floor taken message 3500 according to an embodiment.

The floor taken message 3500 may be sent to inform a non-requesting floor control terminal that the floor has been granted to another terminal.

A SSRC field 3510 may include a SSRC of a floor granted terminal. A user ID field 3520 may include a user ID of the floor granted terminal.

Figure 36:
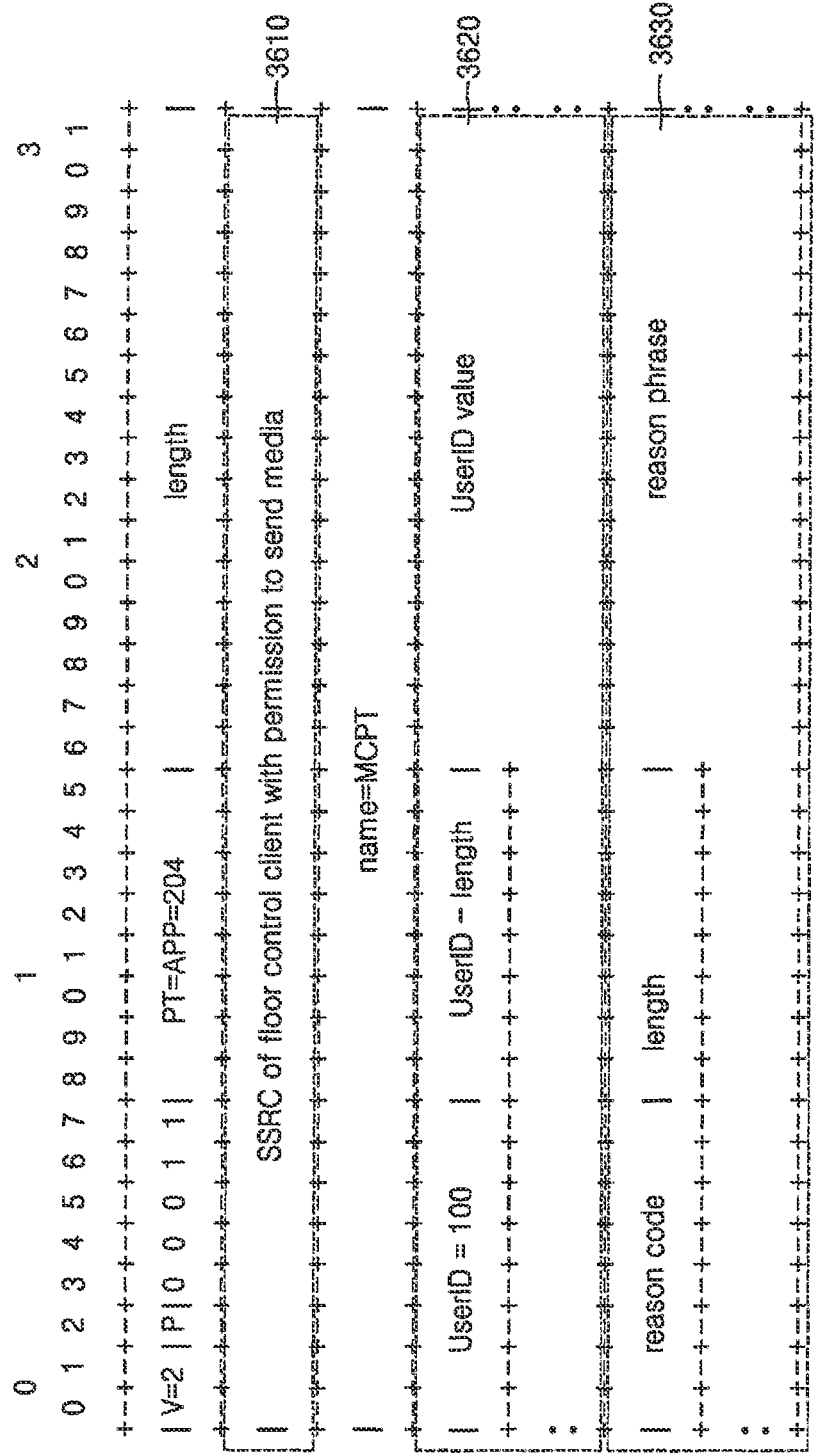
FIG. 36 is a diagram showing a floor deny message according to an embodiment.

FIG. 36 is a diagram showing a floor deny message 3600 according to an embodiment.

The floor deny message 3600 may be sent from a floor granted terminal to a requesting floor control terminal to inform that a floor request is rejected.

A SSRC field 3610 may include a SSRC of the floor granted terminal. A user ID 3620 may include a user ID of the floor granted terminal. A reason code and reason phrase field 3630 may include information about a reason to reject a floor request. In the reason code and reason phrase field 3630, a length field indicates a length of a reason phrase field in bytes. When the length field is set to 0, there is no reason in the reason phrase field. The reason phrase field may include a text string with additional information. The text string may use the same encoding as the text strings in the SAES item CNAME as specified in IETF RFC 3550.

Figure 37:
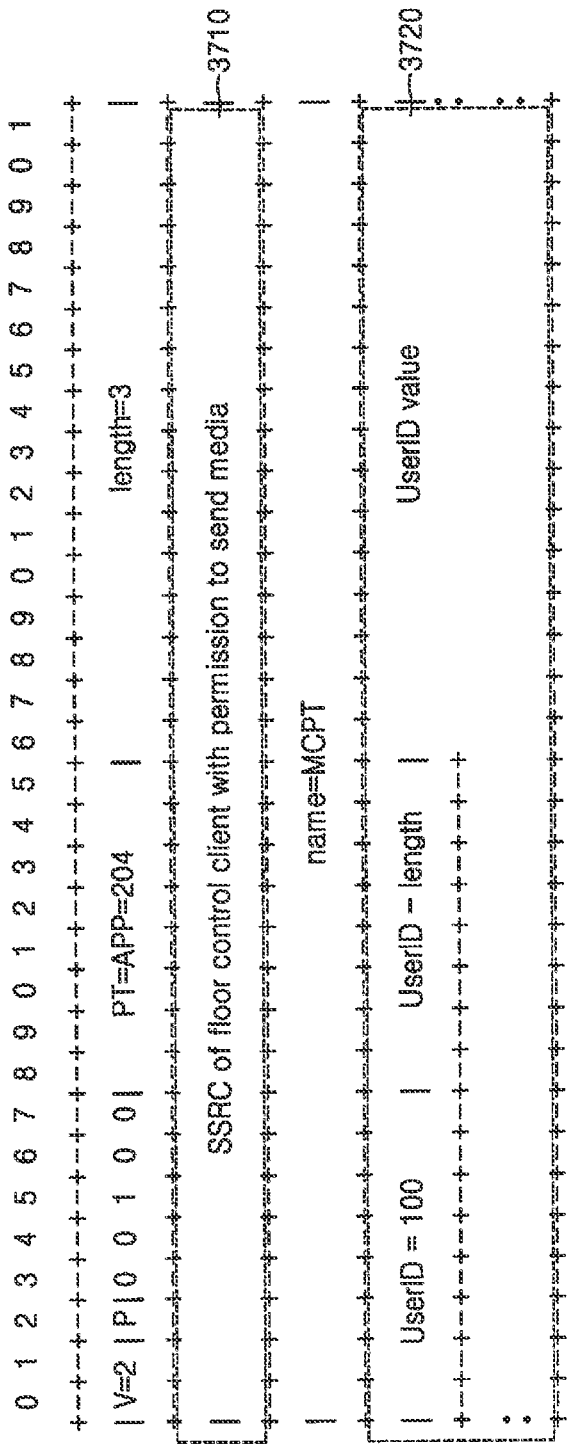
FIG. 37 is a diagram showing a floor release message according to an embodiment.

FIG. 37 is a diagram showing a floor release message 3700 according to an embodiment.

The floor release message 3700 may be sent to a floor granted terminal to inform that the floor is released.

For another example, the floor release message 3700 may be sent when the floor control terminal has information of terminals in a floor request queue. In this case, the floor release message 3700 may be sent to cancel a floor request.

A SSRC field 3710 may include a SSRC of the floor granted terminal. A user ID field 3720 may include a user ID of the floor granted terminal or a terminal sending a floor request message.

Figure 38:
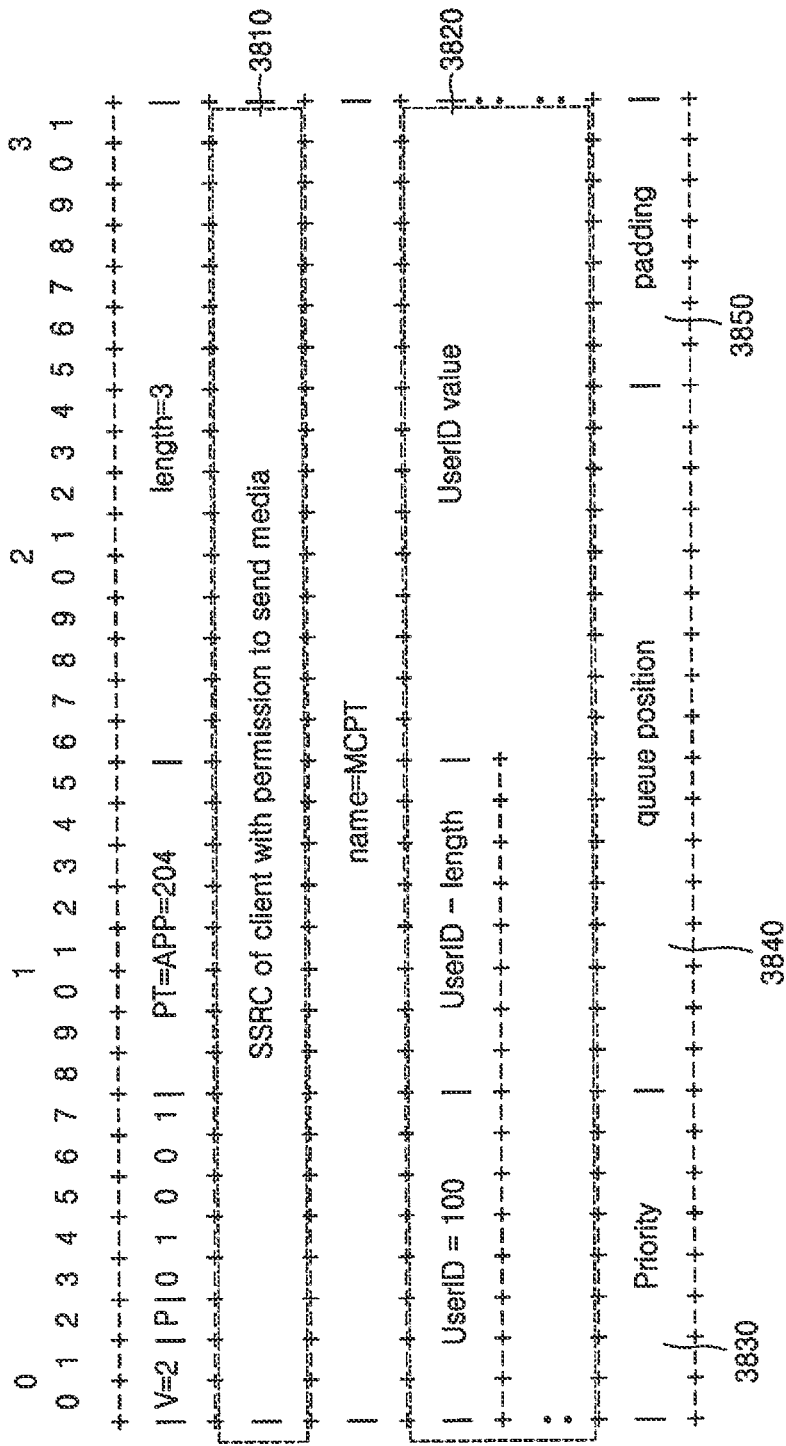
FIG. 38 is a diagram showing a floor request queue status message according to an embodiment.

FIG. 38 is a diagram showing a floor request queue status message 3800 according to an embodiment.

The floor request queue status message 3800 may be sent to notify a floor control terminal of its position in a floor request queue. The floor request queue status message 3800 may be sent in response to a floor request message when a floor request is queued or as a response to the floor request queue status message 3800. For another example, the floor request queue status message 3800 may be sent when a floor request list is changed.

A SSRC field 3810 may indicate a SSRC of the floor granted terminal. A user ID field 3820 may include a user ID of the floor granted terminal. A priority level field 3830 may be a 1 byte field which defines a priority level held by the floor granted terminal. A default value may be 1 when a priority option is not negotiated at a MCPTT call setup. A queue position field may define the number of terminals in the floor request queue status message 3800. A padding field 3850 may be set to zero.

Figure 39:
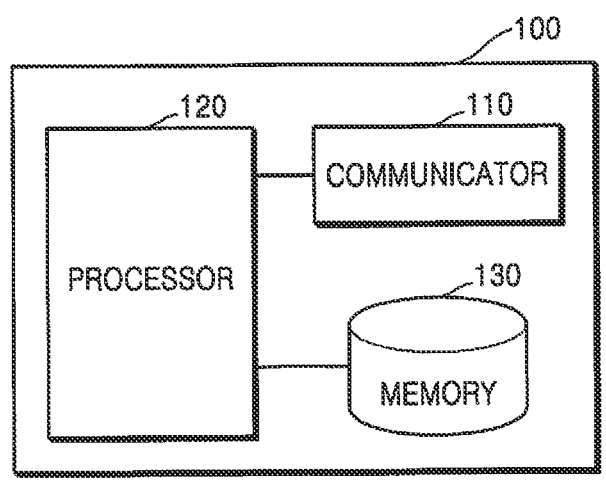
FIG. 39 is a block diagram of a terminal in which an embodiment of the present disclosure is implemented.

FIG. 39 is a block diagram of the terminal 100 in which an embodiment of the present disclosure is implemented.

The terminal 100 may include a communicator 110, a processor 120, and a memory 130.

The communicator 110 may be connected to the processor 120 and transmit and/or receive a radio signal.

For example, the communicator 110 may transmit media to at least one other terminal since the terminal 100 obtains floor. Also, when the media is not received before the expiration of a first timer (for example, T33) indicating a predetermined pending-user action period as a result of monitoring, the communicator 110 may send a floor release message to the at least one other terminal.

The communicator 110 may send a floor reject message to the at least one other terminal when a floor request message is received from one of the at least one terminal during monitoring.

The processor 120 may implement proposed functions, procedures, and/or methods. The above-described operation of the terminal 100 may be implemented by the processor 120. According to an embodiment, the processor 120 may perform processes such as call setup, call type switching, floor control, and the like in a MCPTT service, as described above with reference to FIGS. 1 through 38.

The processor 120 may monitor a signal received by the terminal 100 to grant the floor of the terminal 100 since a predetermined event occurs in the terminal 100. The processor 120 may grant the floor to another terminal when the media is received from the other terminal within a predetermined time after monitoring.

The processor 120 may start the first timer when the media is not received before a second timer (e.g. T20) indicating a granted re-send period expires for a predetermined number of times in a state where a floor request is pending in a queuing list previously stored in the terminal 100.

When there is corresponding identification information between identification information included in the floor release message received in the terminal 100 and identification information of the terminal 100 stored in the queuing list of the terminal 100, the processor 120 may remove the corresponding identification information.

The memory 130 may be connected to the processor 120 and store protocols and parameters for operation. For example, the memory 130 may store the queuing list.

The processor 120 may include an application-specific integrated circuit (ASIC), other chipset, logic circuitry and/or data processing device. The memory 130 may include read-only memory (ROM), random access memory (RAM), flash memory, memory cards, storage media, and/or other storage devices. A RF unit may include a baseband circuit for processing a radio signal. When an embodiment is implemented in software, the above-described technique may be implemented by a module (process, function, etc.) that performs the above-described function. The module may be stored in the memory 130 and executed by the processor 120. The memory 130 may be inside or outside the processor 120, and may be connected to the processor 120 by various well known means.

In the exemplary system described above, although the methods are described on the basis of a flowchart as a series of operation or blocks, the present disclosure is not limited to the order of the operations, and some operations may occur in different orders from those described above or simultaneously. It will also be understood by one of ordinary skill in the art that the operations shown in the flowchart are not exclusive and that other operations may be included or that one or more operations in the flowchart may be removed without affecting the scope of the present disclosure.

The above-described embodiments include examples of various aspects. While it is not possible to describe every possible combination for expressing various aspects, one of ordinary skill in the art will recognize that other combinations are possible. Accordingly, it is intended that the present disclosure include all alternatives, modifications and variations that fall within the scope of the following claims.

All references, including publications, patent applications, and patents, cited herein are hereby incorporated by reference to the same extent as if each reference were individually and specifically indicated to be incorporated by reference and were set forth in its entirety herein.

For the purposes of promoting understanding of the principles of the present disclosure, reference has been made to the preferred embodiments illustrated in the drawings, and specific language has been used to describe these embodiments. However, no limitation of the scope of the present disclosure is intended by this specific language, and the disclosure should be construed to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the disclosure may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

What is claimed is:

1. A method, performed by a terminal, of performing communication, the method comprising:
    generating and storing an emergency offer session description protocol (SDP), based on an indication from a user to upgrade a call to an emergency call, wherein the terminal is in an in-progress private call state;
    generating a private call setup request message including a call identifier information element (IE), a caller IE, a callee IE, a call type IE set to an emergency private call, and an SDP offer IE with the emergency offer SDP;
    setting a proximity-based services (ProSe) per-packet priority corresponding to the emergency private call, wherein the ProSe per-packet priority is used for transmitting the private call setup request message;
    transmitting, to another terminal, the private call setup request message;
    starting a timer related to private call request retransmission; and
    entering an in-progress emergency private call state from the in-progress private call state.

2. The method of claim 1, further comprising:
    updating a stored caller ID as a user ID of the terminal;
    updating a stored callee ID as a user ID of the other terminal; and
    wherein the caller IE included in the private call setup request message is set to the stored caller ID, and
    wherein the callee IE included in the private call setup request message is set to the stored callee ID.

3. The method of claim 1, further comprising:
    storing a current user location as a user location, and
    wherein the private call setup request message includes a user location IE set with the user location.

4. The method of claim 1, wherein the private call setup request message includes a commencement mode IE corresponding to automatic commencement mode.

5. The method of claim 1, further comprising:
    generating, the private call setup request message, based on expiry of the timer related to private call request retransmission in a case that the terminal is in the in-progress emergency private call state;
    transmitting, to the other terminal, the private call setup request message; and starting the timer related to private call request retransmission, wherein the terminal remains in the in-progress emergency private call state.

6. The method of claim 1, further comprising:
generating a private call emergency cancel message based on expiry of an emergency private call cancel retransmission timer in a case that the terminal is in the in-progress private call state;
transmitting, to the other terminal, the private call emergency cancel message; and
starting the emergency private call cancel retransmission timer,
wherein the terminal remains in the in-progress private call state.

7. The method of claim 6, wherein the private call emergency cancel message includes a call identifier IE set with a stored call identifier, a caller IE set with a stored caller ID, and a callee IE set with a stored callee ID.

8. A terminal for performing communication, the terminal comprising:
a transceiver; and
a processor coupled with the transceiver and configured to:
generate and store an emergency offer session description protocol (SDP), based on an indication from a user to upgrade a call to an emergency call, wherein the terminal is in an in-progress private call state,
generate a private call setup request message including a call identifier information element (IE), a caller IE, a callee IE, a call type IE set to an emergency private call, and an SDP offer IE with the emergency offer SDP,
set a proximity-based services (ProSe) per-packet priority corresponding to the emergency private call, wherein the ProSe per-packet priority is used for transmitting the private call setup request message,
control the transceiver to transmit, to another terminal, the private call setup request message,
start a timer related to private call request retransmission, and
enter an in-progress emergency private call state from the in-progress private call state.

9. The terminal of claim 8, wherein the processor is further configured to:
update a stored caller ID as a user ID of the terminal, and
update a stored callee ID as a user ID of the other terminal,
wherein the caller IE included in the private call setup request message is set to the stored caller ID, and
wherein the callee IE included in the private call setup request message is set to the stored callee ID.

10. The terminal of claim 8, wherein the processor is further configured to:
store a current user location as a user location, and
wherein the private call setup request message includes a user location IE set with the user location.

11. The terminal of claim 8, wherein the processor is further configured to:
generate, the private call setup request message, based on expiry of the timer related to private call request retransmission in a case that the terminal is in the in-progress emergency private call state,
transmit, to the other terminal, the private call setup request message, and
start the timer related to private call request retransmission,
wherein the terminal remains in the in-progress emergency private call state.

12. The terminal of claim 8, wherein the processor is further configured to:
generate a private call emergency cancel message based on expiry of an emergency private call cancel retransmission timer in a case that the terminal is in the in-progress private call state,
transmit, to the other terminal, the private call emergency cancel message, and
start the emergency private call cancel retransmission timer,
wherein the terminal remains in the in-progress private call state.

13. The terminal of claim 12, wherein the private call emergency cancel message includes a call identifier IE set with a stored call identifier, a caller IE set with a stored caller ID, and a callee IE set with a stored callee ID.

14. The terminal of claim 8, wherein the private call setup request message includes a commencement mode IE corresponding to automatic commencement mode.

15. A non-transitory computer-readable recording medium having recorded thereon a program for executing instructions, wherein the instructions, when executed, cause a processor to:
generate and store an emergency offer session description protocol (SDP), based on an indication from a user to upgrade a call to an emergency call, wherein the terminal is in an in-progress private call state;
generate a private call setup request message including a call identifier information element (IE), a caller IE, a callee IE, a call type IE set to an emergency private call, and an SDP offer IE with the emergency offer SDP;
set a proximity-based services (ProSe) per-packet priority corresponding to the emergency private call, wherein the ProSe per-packet priority is used for transmitting the private call setup request message;
transmit, to another terminal, the private call setup request message;
start a timer related to private call request retransmission; and
enter an in-progress emergency private call state from the in-progress private call state.

* * * * *